US009002335B2

(12) United States Patent
Fighel

(10) Patent No.: US 9,002,335 B2
(45) Date of Patent: Apr. 7, 2015

(54) SYSTEMS AND METHODS FOR TERMINATING TELEPHONY COMMUNICATIONS TO MOBILE TELEPHONY DEVICES

(76) Inventor: Guy Fighel, Red Bank, NJ (US)

( * ) Notice: Subject to any disclaimer, the term of this patent is extended or adjusted under 35 U.S.C. 154(b) by 53 days.

(21) Appl. No.: 13/597,485

(22) Filed: Aug. 29, 2012

(65) Prior Publication Data

US 2013/0163478 A1  Jun. 27, 2013

Related U.S. Application Data

(63) Continuation-in-part of application No. 13/492,361, filed on Jun. 8, 2012, which is a continuation-in-part of application No. 13/334,849, filed on Dec. 22, 2011, now Pat. No. 8,600,364.

(51) Int. Cl.
  *H04M 3/42* (2006.01)
  *H04W 4/16* (2009.01)
  *H04L 29/06* (2006.01)

(52) U.S. Cl.
  CPC ............. *H04W 4/16* (2013.01); *H04L 65/1069* (2013.01); *H04L 65/1096* (2013.01); *H04L 65/1036* (2013.01)

(58) Field of Classification Search
  USPC ............. 455/414.1, 432.1, 432.3, 433, 453.1, 455/453.2, 428, 560, 41.2, 417, 415, 445, 455/461, 414, 462, 465, 424, 416, 455/435.1–444, 564, 562; 370/331, 392, 370/230.1, 328, 329, 330, 336, 337, 338, 370/341, 347, 442, 395.52, 352, 259
  See application file for complete search history.

(56) References Cited

U.S. PATENT DOCUMENTS

| | | |
|---|---|---|
| 5,745,850 A | 4/1998 | Aldermeshian et al. |
| 6,088,126 A | 7/2000 | Khouri et al. |
| 6,615,037 B1 | 9/2003 | Bharatia et al. |
| 7,116,975 B1 | 10/2006 | Link et al. |
| 7,379,436 B2 | 5/2008 | Jiang |
| 7,551,920 B1 | 6/2009 | Ngan |
| 7,990,912 B2 | 8/2011 | Nix et al. |
| 8,139,753 B2 | 3/2012 | Pickering et al. |

(Continued)

OTHER PUBLICATIONS

Office Action issued in U.S. Appl. No. 13/334,849 on Mar. 16, 2012.

(Continued)

*Primary Examiner* — Chuong A Ngo
(74) *Attorney, Agent, or Firm* — Nixon & Vanderhye, P.C.; Joseph Pagnotta

(57) ABSTRACT

Systems and methods for terminating telephony communications to a mobile telephony device via a data network make use of a forwarding termination service. The forwarding termination service causes a native mobile telephony service provider that provides service to the mobile telephony device to forward incoming telephony communications directed the native telephone number of the mobile telephony device to a forwarding access number. The forwarding termination service receives telephony communications directed to the forwarding access number, and then terminates the telephony communications to the mobile telephony device via any one of multiple different methods. The mobile telephony service provider can be instructed to implement and cancel call forwarding instructions by a forwarding agent that is separate from the forwarding termination service.

17 Claims, 11 Drawing Sheets

(56) References Cited

U.S. PATENT DOCUMENTS

| | | |
|---|---|---|
| 2001/0040954 A1 | 11/2001 | Brachman et al. |
| 2003/0003900 A1 | 1/2003 | Goss et al. |
| 2004/0076140 A1 | 4/2004 | Begeja et al. |
| 2004/0248563 A1 | 12/2004 | Ayers et al. |
| 2007/0015536 A1 | 1/2007 | Labauve et al. |
| 2007/0064682 A1 | 3/2007 | Adams et al. |
| 2007/0121580 A1 | 5/2007 | Forte et al. |
| 2007/0167167 A1* | 7/2007 | Jiang .............................. 455/453 |
| 2007/0274485 A1 | 11/2007 | Garrison |
| 2008/0039080 A1 | 2/2008 | Bertagnole et al. |
| 2008/0075261 A1 | 3/2008 | Ramanathan et al. |
| 2008/0153480 A1 | 6/2008 | Jiang |
| 2008/0244148 A1 | 10/2008 | Nix et al. |
| 2009/0116636 A1 | 5/2009 | Pickering et al. |
| 2009/0141882 A1 | 6/2009 | Baeza |
| 2010/0124323 A1 | 5/2010 | Herndon et al. |
| 2011/0096771 A1 | 4/2011 | Saru et al. |
| 2013/0005308 A1 | 1/2013 | Wouterse |
| 2013/0059574 A1 | 3/2013 | Fighel et al. |
| 2013/0065571 A1 | 3/2013 | Fighel et al. |
| 2013/0163477 A1 | 6/2013 | Fighel |
| 2013/0163478 A1 | 6/2013 | Fighel |
| 2013/0163479 A1 | 6/2013 | Fighel |
| 2013/0165083 A1 | 6/2013 | Fighel et al. |
| 2013/0165089 A1 | 6/2013 | Fighel |
| 2013/0165090 A1 | 6/2013 | Fighel |
| 2013/0165091 A1 | 6/2013 | Fighel |
| 2013/0165092 A1 | 6/2013 | Fighel |
| 2013/0165093 A1 | 6/2013 | Fighel |
| 2013/0165094 A1 | 6/2013 | Fighel |
| 2013/0165095 A1 | 6/2013 | Fighel |
| 2013/0165097 A1 | 6/2013 | Fighel |

OTHER PUBLICATIONS

Office Action issued in U.S. Appl. No. 13/492,361 on Jul. 20, 2012.
International Search Report issued in PCT/US2012/071248 on Oct. 4, 2013.
Written Opinion issued in PCT/US2012/071248 on Oct. 4, 2013.
"3rd Generation Partnership Project; Technical Specification Group Core Network and Terminals; Call Forwarding (CF) supplementary services; Stage 2 (Release 11)", 3GPP Standard; 3GPP TS 23.082, 3rd Generation Partnership Project (3GPP), Mobile Competence Centre; 650, Route Des Lucioles, F-06921 Sophia-Antipolis Cedex; France, vol. CT WG4, No. V11.0.0, Dec. 17, 2011, pp. 1-86, XP050554577, [retrieved on Dec. 17, 2011] paragraphs [0001] - [01.2]; figures 1.1, 1.11.
Anonymous: "Easy Call Forwarding App" Android Forums, Dec. 2, 2010 pp. 1-4, XP055066320, Retrieved from the Internet: URL:http://androidforums.com/android-applications/7380-easy-call-forwarding-app.html [retrieved on Jun. 12, 2013] the whole document.
Rosenberg et al., SIP: Session Initiation Protocol, Internet Engineering Task Force, RFC 3261, Jun. 2002, 269 pages.
Dierks et al., The Transport Layer Security (TLS) Protocol, version 1.2, Network Working Group, RFC 5246, Aug. 2008, 105 pages.
Jonsson et al., Public-Key Cryptography Standards (PKCS) #1: RSA Cryptography Specifications, version 2.1, Network Working Group, RFC 3447, Feb. 2003, 72 pages.
"Advance Encryption Standard" (AES), Federal Information Processing Standards Publication 197, Nov. 26, 2001, 51 pages.
Call Forwarding; Wikipedia, the free encyclopedia; Dec. 11, 2012; pp. 1-5.
How to Forward Calls on the iPhone and any other ATT cell phone—Know Your Cell; Dec. 11, 2012; pp. 1-2.
"3rd Generation Partnership Project; Technical Specification Group Services and System Aspects; Voice Call Continuity (VCC) between Circuit Switched (CS) and IP Multimedia Subsystem (IMS); Stage 2 (Release 7) " 3GPP TS 23.206. 3rd Generation Partnership Project (3GPP). Mobile Competence Centre ; 650. Route Des Lucioles ; F-06921 Sophia-Antipolis Cedex; France No. V7.5.0. Dec. 1, 2007. pp. 1-36. XP050363131. paragraphs [0005] - [051]; figure 5.1 paragraph [6.5.2.3] paragraphs [Annex:A] - [Annex:A.1].

\* cited by examiner

SYSTEMS AND METHODS FOR TERMINATING TELEPHONY COMMUNICATIONS TO MOBILE TELEPHONY DEVICES

CROSS-REFERENCE TO RELATED APPLICATIONS

This application is a continuation-in-part of U.S. patent application Ser. No. 13/492,361, filed Jun. 8, 2012, which is itself a continuation-in-part of U.S. patent application Ser. No. 13/334,849, filed Dec. 22, 2011 now U.S. Pat. No. 8,600,364, the entire contents of both of which are herein incorporated by reference.

FIELD OF THE INVENTION

The invention is related to systems and methods for terminating telephony communications to a telephony device. More specifically, the invention relates to systems and methods for terminating telephony communications to a telephony device via a non-native Voice over Internet Protocol telephony system.

BACKGROUND OF THE INVENTION

Mobile telephony devices, such as cellular telephones and mobile computing devices with cellular telephony capabilities, are typically provided with service from a cellular service provider. The cellular service provider typically only provides service to its customers within a defined geographical area, often only within a single country. The area served by the provider is considered the "native" service area for customers who receive cellular telephone service from the provider.

If a customer who receives cellular telephone service from a first "native" cellular service provider travels to an area outside his native service area, the customer's cellular telephone may be capable of receiving cellular service from a second "non-native" cellular service provider that provides coverage in that location. However, because the non-native cellular service provider is not the customer's regular service provider, the customer will be charged special "roaming" fees for receiving incoming communications and for sending outgoing communications from that location. Typically, the non-native cellular service provider charges the user's native cellular service provider for providing service to the customer's cellular telephone, and the native cellular service provider then passes those charges along to the customer as part of his regular monthly bill. This is true for telephone calls, text messages, and other forms of telephony communications.

Roaming charges can be exorbitant compared to fees charged for telephony communications within the customer's native service area. International roaming charges are particularly expensive, as the rates negotiated between carriers for overseas call termination has been at a premium.

DETAILED DESCRIPTION OF PREFERRED EMBODIMENTS

Figure 1:
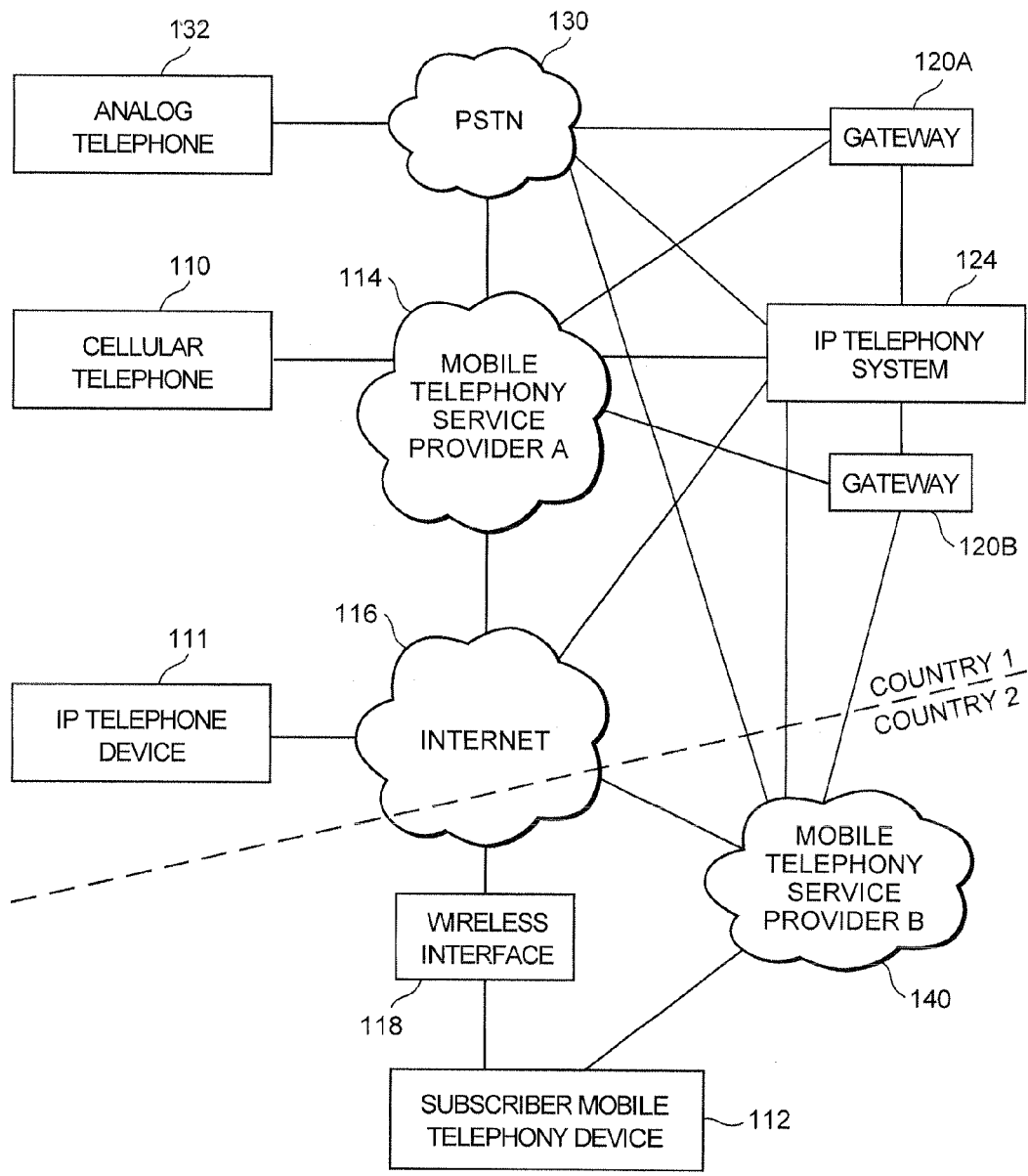
FIG. 1 is a system level representation of elements that interact with each other to terminate telephony communications to mobile telephony devices.

In the following description, references are made to a user's or a customer's telephony device. This term encompass traditional cellular telephones, as well as mobile telephony devices that include additional functionality, such as the ability to wirelessly communicate digital data. These terms also encompass mobile computing devices that include communications capabilities provided by either or both of a cellular transceiver and a wireless digital data transceiver. Examples of such devices include the Apple iPhone™, the Apple iPod Touch™, mobile telephony devices running the Android™ operating system, the Blackberry™ and mobile telephones running the Symbian operating system.

The following description also refers to terminating a telephony communication. This phrase refers to completing an incoming telephony communication, such as a voice or video telephone call, to a telephony device. This phrase also encompasses delivering text messages and other forms of text-based or video-based messaging to a telephony device. This phrase also encompasses other forms of communications that may be carried over a telephony network.

The term "call" or "telephone call" is used in the following description for ease of reference, clarity and brevity. However, all of the systems and methods described below which involve handling, routing and terminating calls would also apply to systems and methods of handling, routing and terminating other forms of telephony-based communications. Thus, the terms call and telephone call are intended to include other forms of telephony-based communications.

The invention provides a method, system and apparatus for terminating a telephony communication to a telephony device via a Voice over Internet Protocol (VOIP) telephony system. In some instances, the telephony communication is terminated to the telephony device through the VOIP telephony system because the telephony device is roaming, and roaming charges would otherwise be applied if the telephony communication was terminated in a traditional fashion. Terminating the telephony communication through the VOIP telephony system makes it possible to avoid the roaming charges. In other instances, the telephony communication is terminated through the VOIP telephony system for some other reason, as will be explained below.

In some instances, however, such as where no other options exist, the IP telephony system might deliberately cause the telephony communication to be terminated to a roaming telephony device in a traditional fashion through a non-native mobile telephony service provider. While this would result in the user incurring roaming charges, terminating the telephony communication in this fashion may be the only way to reach the user.

In some systems and methods embodying the invention, telephony communications are effected over a packet-based data network. Signaling that is conducted in the packet-based data network is preferably executed using Session Initiation Protocol (SIP). SIP is a popular communication protocol for initiating, managing and terminating media (e.g., voice, data and video) sessions across packet-based data networks that typically use the Internet Protocol (IP), of which Voice Over Internet Protocol (VOIP) is an example. The details and functionality of SIP can be found in the Internet Engineering Task Force (IETF) Request for Comments (RFC) Paper No. 3261 entitled, "SIP: Session Initiation Protocol" herein incorporated in its entirety by reference.

SIP establishes and negotiates a session, including the modification or termination of a session. It uses a location-independent address system feature in which called parties can be reached based on a party's name. SIP supports name mapping and redirection, allowing users to initiate and receive communications from any location. Of course, while SIP is a preferred protocol for establishing communications over a data network, other signaling protocols could also be used to perform the invention.

The following description provides examples of how the invention can be used to terminate telephony communications to a mobile telephone device via a VOIP telephony system. The mobile telephony device could be a cellular telephony or a smart phone. However, the invention is also applicable to other types of telephony devices. Thus, the reference to a mobile telephony device should not be considered in any way limiting. Systems and methods embodying the invention can also be used to terminate telephony communications to telephony devices other than traditional mobile telephony devices.

FIG. 1 depicts various elements that may be involved in terminating telephony communications to a mobile telephony device. The elements in FIG. 1 include a subscriber mobile telephony device 112. The subscriber mobile telephony device 112 may have a native ability to handle voice over Internet protocol telephony communications sent via a data channel. In other instances, an application running on the subscriber mobile telephony device 112 may provide the capability of handling voice over Internet protocol telephony communications sent via a data channel. In still other instances, as explained more fully below, a browser on a subscriber mobile telephony device 112 may access a software application that is running on a processor located elsewhere, and the software application may provide the capability of handling voice over Internet protocol telephony communications sent via a data channel.

Mobile telephony service provider A 114 is located in country 1 and provides telephony service to mobile telephony devices located in country 1. Mobile telephony service provider A 114 could be, for example, a cellular telephone network. For purposes of the following description, mobile telephony service provider A 114 is the native mobile telephony service provider that provides service to the subscriber mobile telephony device 112.

FIG. 1 also depicts a traditional publicly switched telephone network (PSTN) 130. An analog telephone 132 can utilize the PSTN 130 to place and receive calls. The analog telephone 132 could call the subscriber mobile telephony device 112, and the call would be routed through the PSTN 130, then through mobile telephony service provider B 140 to the subscriber mobile telephony device 112.

FIG. 1 also depicts a cellular telephone 110 that is provided with service by mobile telephony service provider A 114. The cellular telephone 110 could call the subscriber mobile telephony device 112 through mobile telephony service provider B 140.

FIG. 1 further depicts an IP telephony device 111 that maintains a data connection to a packet network, such as the Internet 116. The IP telephony device 111 is provided with telephony service by an IP telephony system 124 which is also connected to the Internet 116. If the user of the IP telephony device 111 wishes to establish a call with the subscriber mobile telephony device 112, the IP telephony device 111 sends a call setup request to the IP telephony system 124 via the Internet 116. The IP telephony system 124 then routes the call through mobile telephony service provider B 140 to the subscriber mobile telephony device 112. FIG. 1 also depicts that the IP telephony system 124 may use gateways 120A, 120B to communicate with the PSTN 130, mobile telephony service provider A 114, as well as other telephony service providers.

FIG. 1 further depicts that mobile telephony service provider B 140 is located in country 2 and provides service to mobile telephony devices located in country 2. Mobile telephony service provider B 140 could also be a cellular service provider.

Finally, FIG. 1 illustrates that the subscriber mobile telephony device 112 is located in country 2, and it is capable of wirelessly accessing the Internet 116 via a wireless interface 118. This allows the subscriber mobile telephony device 112 to send and receive data communications over the Internet 116. The wireless interface 118 could be a wireless router operating under the WiFi or WiMax standards, or any other type of wireless interface device that is capable of communicating with the subscriber mobile telephony device 112 and the Internet 116. In other instances, the subscriber mobile telephony device 112 could establish a data link to the Internet, or to some other data network, in other ways. For example, the subscriber mobile telephony device 112 could communicate through a wireless Local Area Network (LAN), a Wide Area Network (WAN) gateway, a hardwired Internet connection and the like.

Although the subscriber mobile telephony device 112 is capable of sending and receiving data communications through the wireless interface 118, the subscriber mobile telephony device 112 is also capable of establishing a data channel through a mobile telephony service provider. The data channel would be separate from a channel used for audio communications. Thus, the subscriber mobile telephony device 112 is capable of sending and receiving data communications via two independent pathways.

As explained above, mobile telephony service provider A 114, located in country 1, is the native service provider for the subscriber mobile telephony device 112. When located in country 2, the subscriber mobile telephony device 112 only has access to mobile telephony service provider B 140 to send and receive telephony communications. This results in the subscriber incurring roaming charges.

As will be described in more detail below, elements of the IP telephony system 124 are capable of terminating telephony communications to the subscriber mobile telephony device 112 via a data connection passing over the Internet 116. In some instances, the IP telephony system 124 may also be capable of terminating telephony communications to the subscriber mobile telephony device 112 via a data connection passing over a data channel provided by mobile telephony service provider B 140. So long as the cost of obtaining that data connection is lower than the cost of receiving a telephone call via mobile telephony service provider B 140 over a mobile voice channel, this may be a preferred way of terminating the telephony communication to the subscriber mobile telephony device 112.

Figure 2:
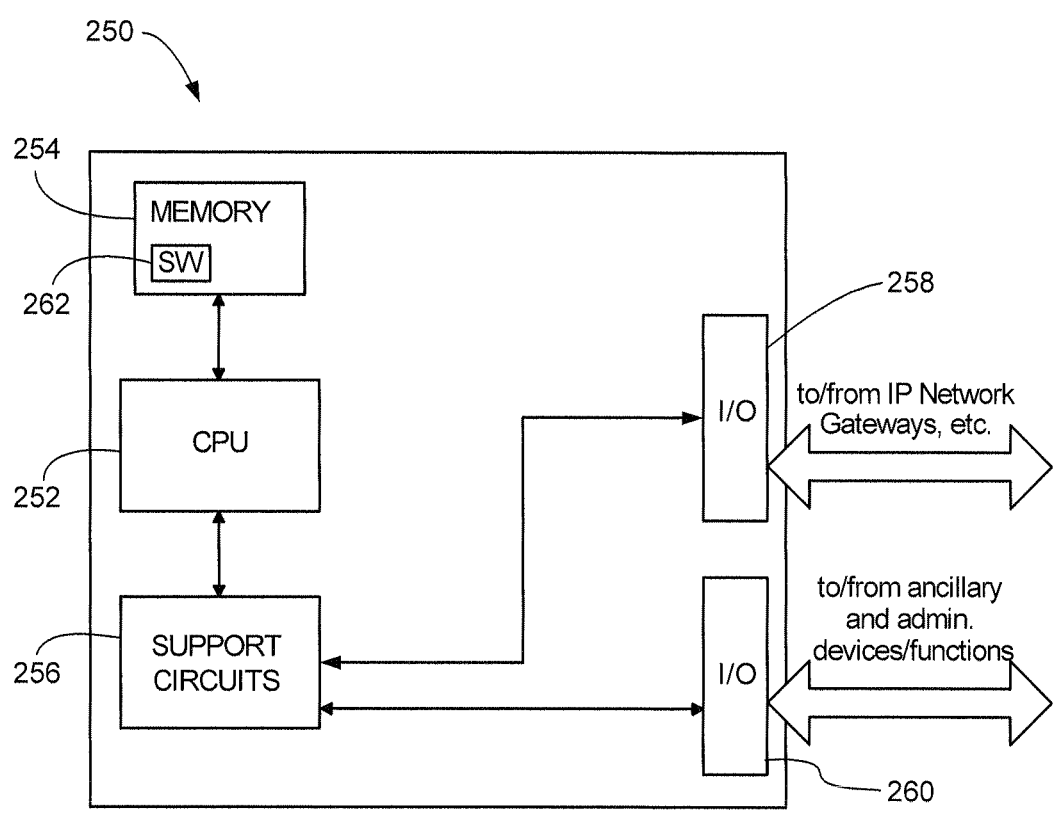
FIG. 2 is a schematic diagram of a controller that may be used to practice one or more embodiments of the present invention.

FIG. 2 illustrates elements of a computer processor 250 that can be used as part of the system operated by the IP telephony service provider 124 to accomplish various functions. The IP telephony service provider 124 could utilize multiple processors 250 located at various locations, along with their operating components and programming, each carrying out a specific or dedicated portion of the functions performed by the IP telephony service provider 124.

The processor 250 shown in FIG. 2 may be one of any form of a general purpose computer processor used in operating an IP based communication system. The processor 250 comprises a central processing unit (CPU) 252, a memory 254, and support circuits 256 for the CPU 252. The processor 250 also includes provisions 258/260 for connecting the processor 250 to/from the data network 110 and gateways 122, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

Another form of processor 250 that assists in execution and is otherwise part of the subject invention is found within one or more of the mobile telephony devices. Such devices are sufficiently advanced beyond early generation cellular telephones that they contain processors capable of running operating systems developed by device manufactures, as well as third party applications that are downloaded and installed by users to performing a myriad of communications and non-communications oriented tasks.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 124. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

Figure 3:
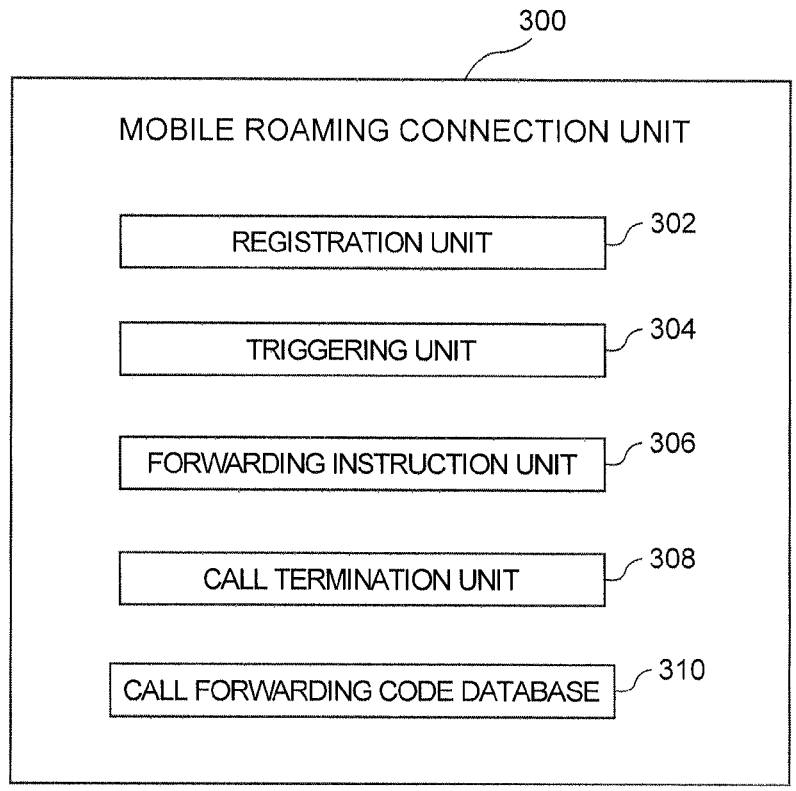
FIG. 3 is a block diagram illustrating elements of a forwarding connection unit embodying the invention.

The IP telephony system 124 includes a forwarding connection unit 300, as illustrated in FIG. 3. The forwarding connection unit 300 includes a registration unit 302, a triggering unit 304, a forwarding instruction unit 306, a call termination unit 308, and an optional call forwarding code database 310. These elements act together to register a mobile telephony device with a forwarding termination service provided by the IP telephony system 124. These elements also act to determine when the forwarding termination service should be activated or deactivated, and to route telephony communications to registered telephony devices when the forwarding termination service is activated. Whenever possible, the forwarding connection unit 300 terminates telephony communications to a telephony device in a manner that does not result in the user incurring roaming charges.

In some embodiments, any time that the subscriber mobile telephony device 112 detects the availability of a data network connection, such as through the wireless interface 118, the subscriber mobile telephony device 112 contacts the forwarding connection unit 300 and registers with same. Once registered, the IP telephony system 124 is capable of routing telephony communications to the subscriber mobile telephony device 112 via the data network connection. In some embodiments, however, the subscriber mobile telephony device 112 may only attempt to register with the forwarding connection unit 300 if the subscriber mobile telephony device determines that it is outside of its native service area and is roaming. In still other embodiments, the subscriber mobile telephony device 112 may attempt to register with the forwarding connection unit 300 when it is still within its native service area, but when the device is unable to establish a connection to its native mobile telephony service provider.

In other instances, a subscriber mobile telephony device 112 may attempt to register with the forwarding connection unit 300 for other reasons. For example, any time that the cost to receive a telephony communication via a native or non-native mobile telephony service provider exceeds a threshold value, the subscriber mobile telephony device 112 may be configured to instead register with the forwarding connection unit 300 of an IP telephony system to avoid those charges. This could occur even if the subscriber mobile telephony device 112 never leaves its native service area. In some instances, the subscriber mobile telephony device 112 may deliberately choose to register itself with the forwarding connection unit 300 when it is within its native service area, and when a cellular channel to mobile telephony service provider A 114 is available. This might allow the subscriber mobile telephony device 112 to receive incoming calls without using up minutes of a calling plan. In this instance, the subscriber might configure his subscriber mobile telephony device 112 such that whenever the subscriber device 112 detects the availability of a data network connection, such as a wireless router 118 connected to the Internet 116, use of the system and methods described above are automatically initiated.

The registration unit 302 acts to register individual mobile telephony devices with the forwarding termination service. Typically a subscriber will already have an existing account with the IP telephony system 124. However, in some instances, a subscriber could register for the forwarding termination service only for purposes of obtaining the forwarding termination service from the IP telephony system 124.

Figure 4:
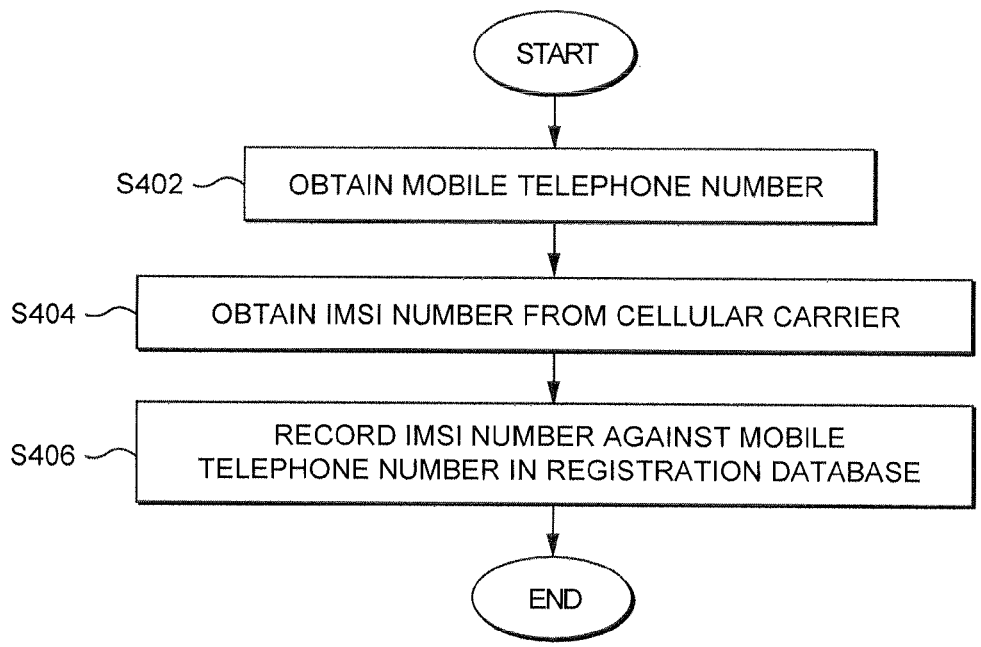
FIG. 4 is a diagram illustrating steps of a method embodying the invention for registering a mobile telephony device with a forwarding termination service.

FIG. 4 illustrates steps of a method of registering a mobile telephony device with the forwarding termination service. As illustrated in FIG. 4, in step S402, the registration unit 302 obtains the native telephone number associated with the subscriber mobile telephony device 112. This native telephone number may have been assigned by mobile telephony service provider A 114, or by some other mobile telephony service provider. The registration unit 300 then creates a new entry in a registration database for the subscriber mobile telephony device 112 that includes the native telephone number.

In step S404, the registration unit 302 obtains an identifier associated with the subscriber mobile telephony device 112 from mobile telephony service provider A 114. In one embodiment of the invention, the identifier is an international mobile subscriber identity (IMSI) number. The IMSI number is a unique identifier associated with all GSM and UMTS network mobile telephone users and conforms to the ITU E.212 numbering standard.

The IMSI number is actually associated with the SIM card present in the subscriber mobile telephony device 112, and it would be contained in a home location register that is maintained by mobile telephony service provider A 114. The IMSI number is often required to be used in certain communications with a mobile telephony service provider when the mobile service provider is being asked to take certain actions with respect to a mobile telephony device. In step S406, the registration unit 302 stores the IMSI number in the record established for the subscriber mobile telephony device 112 in the registration database.

Once the subscriber mobile telephony device 112 has been registered, the forwarding connection unit 300 will have the information it requires to cause telephony communications directed to the regular native telephone number associated with the subscriber mobile telephony device 112 to be redirected to the IP telephony system 124. This is accomplished by instructing mobile telephony service provider A 114 to forward calls directed to the native telephone number associated with the subscriber mobile telephony device 112 to a forwarding access number that is maintained by the IP telephony system 124. Once call forwarding instructions have been implemented, all calls placed to the native telephone number of the subscriber mobile telephony device 112 will be received by the IP telephony system 124 via the forwarding access number. In some embodiments, this would be accomplished using the RTP and SIP protocols. The IP telephony system 124 can then terminate the call to the subscriber mobile telephony device 112 in a fashion that will not incur roaming charges.

The above description refers to obtaining a native telephone number associated with the subscriber mobile telephony device 112. In alternate embodiments, instead of obtaining a native telephony number, one might obtain some other form of identifier that is associated with the subscriber mobile telephony device 112, and which is used to facilitate the termination of telephony communications to the subscriber mobile telephony device 112. The other identifiers may include a user name, an alias, a proxy, and identification number, or any other sort of unique identifier which can be used to help route telephony communications to the subscriber mobile telephony device 112. Although the examples given above and below refer to a telephone number, or a native telephone number, these terms are intended to encompass other forms of unique identifiers. Systems and methods embodying the invention will work equally will with telephone numbers and other forms of identifiers.

Likewise, the above description refers to a forwarding access telephone number. In alternate embodiments, instead of assigning a forwarding access telephone number, some other type of forwarding identifier may be assigned. The forwarding identifier could be a user name, an alias, a proxy, and identification number, or any other sort of unique identifier which can be used to help route telephony communications to the IP telephony system 124. In those instances, the native mobile service provider will be instructed to forward any incoming telephony communications that that are directed to the native telephone number of a subscriber mobile telephony device 112 to the assigned forwarding identifier. In the foregoing and following description, the term "access telephone number" and "forwarding access telephone number" are used. However, these terms are intended to encompass other forms of forwarding identifiers other than telephone numbers.

Figure 5:
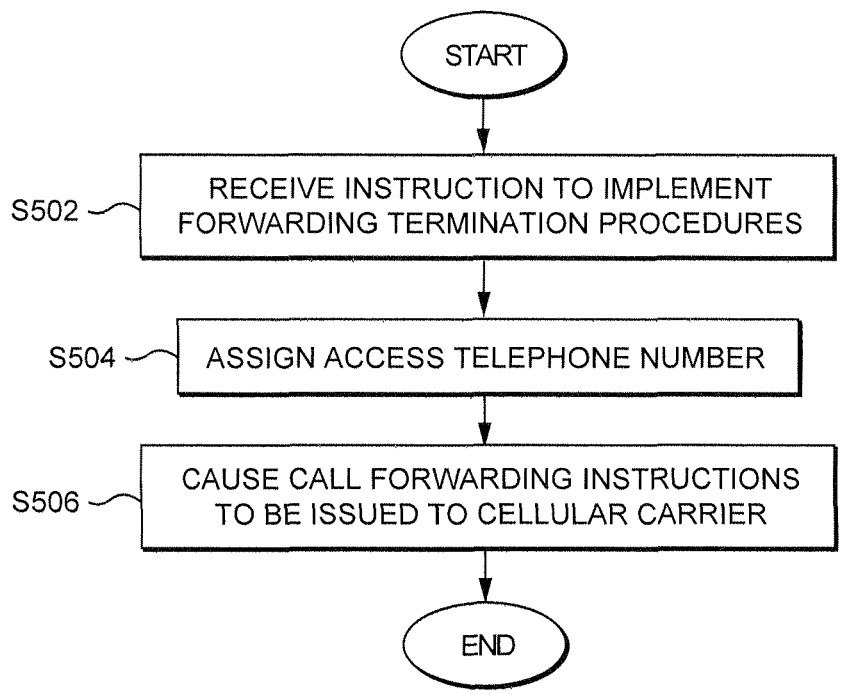
FIG. 5 is a diagram illustrating steps of a method embodying the inventor for implementing call forwarding instructions as part of a method of terminating telephony communications to mobile telephony devices.

FIG. 5 illustrates steps of a method that would be performed by the forwarding connection unit 300 to cause the implementation of call forwarding instructions. The method starts in step S502 when the triggering unit 304 of the forwarding connection unit 300 decides that forwarding instructions should be issued. The triggering unit 304 determines that it is appropriate to implement call forwarding instructions in response to a variety of different conditions, as will be described in more detail below.

In step S504, the forwarding instruction unit 306 assigns a forwarding access telephone number. The forwarding access telephone number (or other forwarding identifier) is stored in a registration database maintained by the IP telephony system 124 against the native telephone number (or other type of identifier) of the subscriber mobile telephony device 112. The forwarding access telephone number may also be stored against an IMSI number associated with the subscriber mobile telephony device 112, or a SIM card that is present in the subscriber mobile telephony device 112. Once the forwarding access number has been assigned, in step S506 the forwarding instruction unit 306 issues call forwarding instructions to mobile telephony service provider A 114 to cause mobile telephony service provider A 114 to forward all calls made to the native telephone number of the subscriber mobile telephony device 112 to the assigned forwarding access number.

In some instances, the IMSI number for a subscriber mobile telephony device 112 may be used in the communications with the mobile telephony service provider A 114 to cause the implementation of the call forwarding instructions. In other embodiments, the IMSI number may not be required. In still other embodiments, some other type of identification number associated with the subscriber mobile telephony device 112 may be used in such communications.

The forwarding access telephone number (or other forwarding identifier) is controlled by the IP telephony system 124. Once the call forwarding instructions have been implemented, any calls made to the native telephone number of the subscriber mobile telephony device 112 are received by the IP telephony system 124. Also, when the IP telephony system 124 receives a call directed to a forwarding access telephone number, the IP telephony system 124 consults the registration database to determine which subscriber mobile telephony device 112 is associated with that forwarding access telephone number. In this fashion, the IP telephony system 124 knows which mobile telephony device the caller is trying to reach.

The subscriber mobile telephony device 112 registers itself with the forwarding connection unit 300 via communications that pass over a data network. Those communications could be sent to the forwarding connection unit 300 over the Internet, via a wireless interface 118. Those communications could also pass over a data channel of a cellular connection. Regardless, the subscriber mobile telephony device 112 contacts the forwarding connection unit 300 and provides information, such as an IP address and a port number, that allows the forwarding connection unit 300 to contact the subscriber mobile telephony device 112 and establish a voice over Internet protocol link with the subscriber mobile telephony device 112. This information would also be stored in the registration database against the other information being maintained for the subscriber mobile telephony device 112.

Once call forwarding instructions have been issued, and once the subscriber mobile telephony device 112 has registered with the forwarding connection unit 300, the forwarding connection unit 300 can route incoming calls to the subscriber mobile telephony device 112 through a data network. The forwarding connection unit 300 establishes a VOIP call with the subscriber mobile telephony device 112, and that call is then connected to the inbound call forwarded from mobile telephony service provider A 114.

Because the incoming call is routed through the data network, rather than through non-native mobile telephony service provider B 140, no roaming charges will be incurred by the user. The user may have to pay to obtain access to the data network. But in many instances, the cost of accessing the data network will be lower than the cost of roaming charges that would otherwise be incurred. For example, if the subscriber mobile telephony device 112 uses a wireless access point, such as a WiFi router, to obtain access to the data network, the charges for such access would likely be far lower than the cost of roaming charges. Even when the subscriber mobile telephony device 112 uses a cellular data channel to obtain access to a data network, the user would likely incur lower charges for data access than the cost of typical roaming charges.

When the subscriber mobile telephony device 112 registers with the forwarding connection unit 300, this event may trigger the forwarding instruction unit 306 to issue call forwarding instructions to mobile telephony service provider A 114. However, a variety of other triggering events might also cause the forwarding instruction unit 306 to issue call forwarding instructions. Also, the triggering events that cause the implementation or cancellation of call forwarding instructions could be customized for an individual user or for an individual subscriber mobile telephony device.

Figure 6:
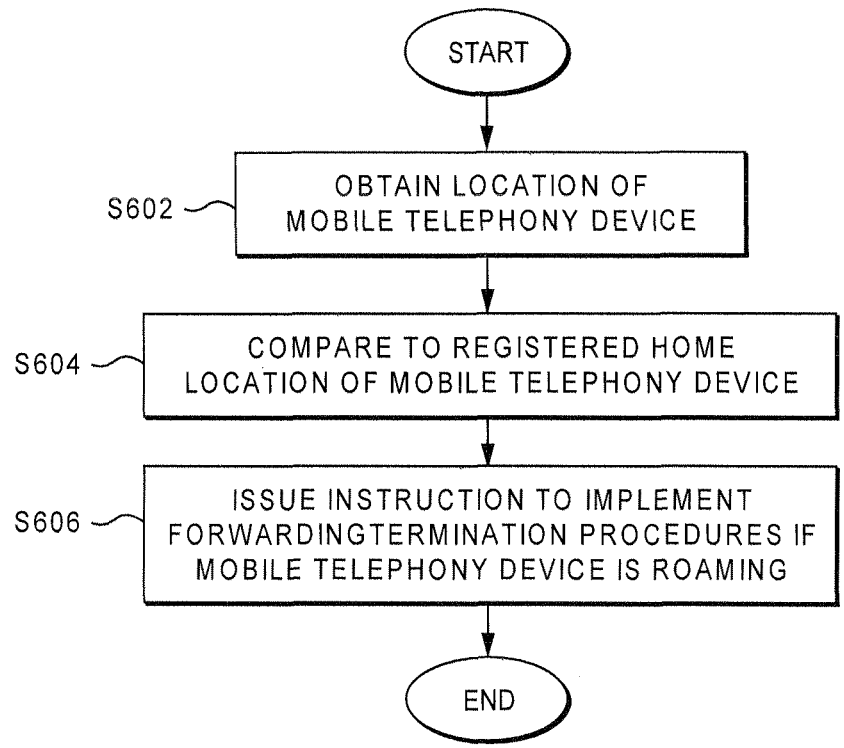
FIG. 6 is a diagram illustrating steps of a method embodying the inventor for triggering the implementation of call forwarding instructions as part of a method of terminating telephony communications to mobile telephony devices.

FIG. 6 illustrates steps of a method that results in call forwarding instructions being issued. The method starts in step S602 when the triggering unit 304 of the forwarding connection unit 300 obtains information about the location of the subscriber mobile telephony device 112. This could be accomplished by having the triggering unit 304 interrogate the subscriber mobile telephony device 112 to obtain location information. Alternatively, an application running on the subscriber mobile telephony device 112 may periodically report the position of the subscriber mobile telephony device to the triggering unit 304.

In other instances the location of the subscriber mobile telephony device 112 may be determined in some other fashion. For example, the position of the subscriber mobile telephony device could be triangulated by elements of a mobile telephony service provider, and this information could be reported to the triggering unit 304, or the triggering unit could request the location information from the mobile telephony service provider.

In some embodiments, the IP address through which a subscriber mobile telephony device 112 registers with the forwarding connection unit 300 could be used to determine the location of the subscriber mobile telephony device 112. The IP address could be the IP address of a wireless access point that the subscriber mobile telephony device 112 has used to gain access to the data network. The subscriber mobile telephony device 112 would be presumed to be immediately adjacent to the wireless access point. Thus, if the location of the wireless access point with the IP address is known, the approximate location of the subscriber mobile telephony device 112 would also be known.

In step S604, the triggering unit 304 compares the location of the subscriber mobile telephony device 112 to the known native service area of the subscriber mobile telephony device 112 to determine if the subscriber mobile telephony device 112 has roamed out of its native service area. If the subscriber mobile telephony device 112 is roaming, then in step S606, the triggering unit 304 issues forwarding instructions to mobile telephony service provider A 114 to have calls placed to the native telephone number of the subscriber mobile telephony device 112 forwarded to a forwarding access number (or other forwarding identifier), as described above. A similar process would be used to cancel call forwarding instructions when the triggering unit 304 determines that the subscriber mobile telephony device has returned to its native service area.

In alternate embodiments, the triggering unit 304 of the forwarding connection unit 300 may monitor the movements of the subscriber mobile telephony device 112 over an extended period of time. If an analysis of the movements of the subscriber mobile telephony device 112 indicate that the device travels outside its native service area according to a regular pattern, such as every Monday morning, and/or that the device travels back into its native service area according to a regular pattern, such as every Friday evening, then this pattern information may be used to trigger the implementation and cancellation of call forwarding instructions. Rather than waiting for the actual location of the subscriber mobile telephony device to be obtained or reported, forwarding instructions may be automatically implemented and canceled based on the predicted movements of the device.

In the methods discussed above, the forwarding instruction unit 306 acts to automatically implement and cancel call forwarding instructions based on the occurrence of an event, or based on a prediction. Likewise, an application running on the subscriber mobile telephony device may itself automatically cause the implementation and cancellation of call forwarding instructions if the application detects that the device has moved out of or back into the subscriber's native calling area. The application may also automatically cause the implementation and cancellation of call forwarding instructions when the application detects that the subscriber mobile telephony device 112 does not have a cellular connection to its native mobile telephony service provider A 114. Similarly, the application may automatically cause the implementation and cancellation of call forwarding instructions when the application detects that a data network connection is available.

Also, the user might take direct action to cause the implementation and cancellation of call forwarding instructions. For example, an application running on the subscriber mobile telephony device 112 may provide a user with the ability to manually cause the implementation and cancellation of call forwarding instructions.

When an application running on the subscriber mobile telephony device 112 is causing the implementation of call forwarding instructions, the application may be directly communicating with the mobile telephony service provider, or the application may communicate with the forwarding connection unit 300 to request that it cause the implementation or cancellation of call forwarding instructions. If the application is directly interacting with the mobile telephony service provider, the application may contact the forwarding connection unit 300 via a data network connection to obtain a forwarding access number. Such communications would also inform the forwarding connection unit 300 that calls received on the forwarding access number should be terminated to the subscriber mobile telephony device 112. Examples of such embodiments are discussed in more detail below.

In other embodiments, other triggering events may cause the implementation and cancellation of call forwarding instructions. For example, if the triggering unit 304 of the forwarding instruction unit 300 determines that the cost of terminating telephony communications to a subscriber mobile telephony device 112 via a native and/or non-native mobile telephony service provider has risen above a threshold value, the triggering unit 304 could automatically cause the implementation of call forwarding instructions. This could occur because the subscriber mobile telephony device 112 has traveled outside its native service area, or for other reasons. Likewise, if the triggering unit 304 of the forwarding instruction unit 300 determines that the cost of terminating telephony communications to a subscriber mobile telephony device 112 via a native and/or non-native mobile telephony service provider has fallen below a threshold value, the triggering unit 304 could automatically cause the cancellation of call forwarding instructions.

In another embodiment of the invention, all incoming telephony communications are forwarded to the IP telephony system 124 at all times. This would require that a dedicated forwarding access number (or other forwarding identifier) be assigned to the subscriber mobile telephony device 112, and call forwarding instructions would always be active. Each time that a call is received on the forwarding access number, the forwarding connection unit 300 checks the connection status of the subscriber mobile telephony device 112 to determine what type of access the subscriber mobile telephony device 112 has. The call is then terminated to the subscriber mobile telephony device 112 in the most appropriate manner. This could mean sending the call through a cellular service provider in a normal manner, or setting up a VOIP telephone link via a data network. If more than one connection method is possible, preference rules would determine how the call is connected.

If there is no such access, the incoming telephony communication could be sent to voicemail, or to some type of interactive voice response system. Alternatively, the incoming telephony communication could be forwarded to another subscriber device or telephone number.

Figure 7:
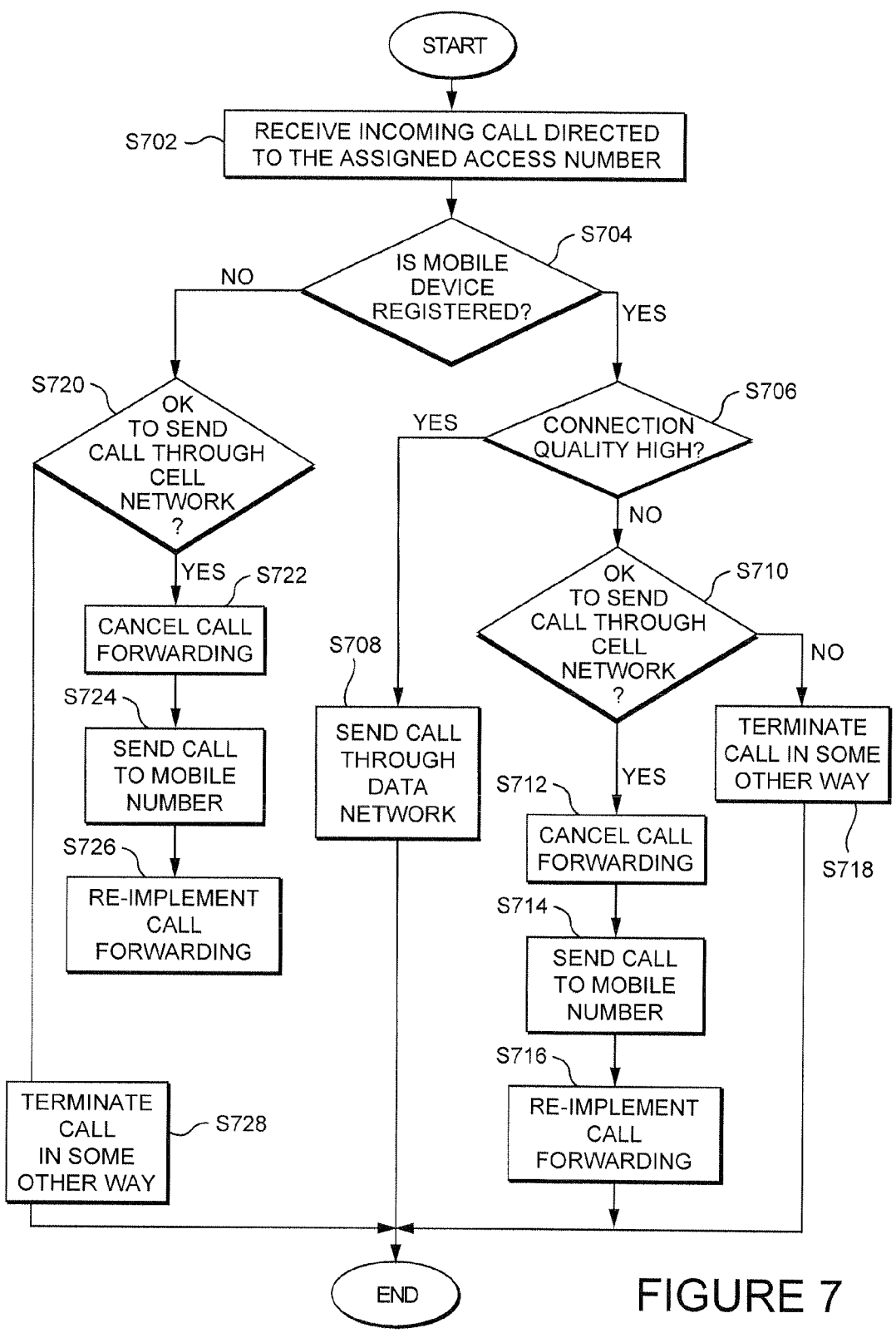
FIG. 7 is a diagram illustrating steps of a method embodying the inventor for terminating telephony communications to a mobile telephony device.

FIG. 7 illustrates steps of a control method embodying the invention which terminates incoming telephony communications to a subscriber mobile telephony device 112 via the most appropriate path. This method would be executed by the forwarding connection unit 300 of an IP telephony system 124 after call forwarding instructions have been implemented. For purposes of the following explanation, the subscriber mobile telephony device 112 is located in country 2 (see FIG. 1), and the subscriber mobile telephony device is capable of receiving incoming telephony communications from mobile telephony service provider B 140.

The method begins in step S702 when an incoming telephony communication is received on a forwarding access number that has been assigned for the subscriber mobile telephony device 112. In step S704, the call termination unit 308 of the forwarding connection unit 300 checks to determine if the subscriber mobile telephony device 112 is registered and reachable via a data network connection. If the subscriber mobile telephony device 112 is registered, in step S706 the call termination unit 308 checks to determine the quality of the data connection. If the data connection is capable of supporting a VOIP call to the subscriber mobile telephony device 112, then in step S708 a VOIP call is established between the IP telephony system 124 and the subscriber mobile telephony device 112 over the data network. The received telephony communication is then terminated to the subscriber mobile telephony device 112 through the VOIP call.

If the quality of the data network connection to the subscriber mobile telephony device 112 is not sufficient, then in step S710 a check is made to determine if the user has authorized calls to be terminated to the subscriber mobile telephony device 112 through non-native mobile telephony service provider B 140. This will likely result in roaming charges. However, the user may choose to accept the roaming charges if there is no other way of receiving an incoming telephony communication. In this scenario, the forwarding connection unit 300 first checks to see if it is possible to terminate the call through alternate means. But if no other means are available, the call is ultimately terminated through the non-native mobile telephony service provider B 140, after call forwarding has been canceled.

The result of the decision reached in step S710 could be conditioned on various things. For instance, the user may have instructed that all calls be terminated through non-native mobile telephony service provider B 140 if no other method of terminating the call exists. In other instances, the user might specify that calls should only be terminated through a non-native telephony service provider if the call will cost less than a threshold amount to complete. In still other instances, the user might specify that only calls originating from a particular set of telephone numbers should be completed through a non-native mobile telephony service provider. This would allow the user to specify that certain important people be put through, but that other calls are not.

If the decision in step S710 is that the call should not be terminated through a non-native mobile telephony service provider, then in step S718 the call is terminated in some other fashion. As discussed above, this could include sending the call to voicemail, playing a recording to the caller that the called party is unavailable, forwarding the call to an alternate telephone number, or terminating the call in some other fashion.

If the decision in step S710 is to terminate the call to the subscriber mobile telephony device 112 through non-native mobile telephony service provider B 140, in step S712 the forwarding instruction unit 306 contacts mobile telephony service provider A 114 and cancels the call forwarding instructions. The call termination unit 308 then sends the call to the regular native telephone number of the subscriber mobile telephony device 112 in step S714. This will cause mobile telephony service provider A 114 to send the call on to mobile telephony service provider B 140, which ultimately completes the call to the subscriber mobile telephony device 112.

Because the call is being routed through the IP telephony system 124, the forwarding connection unit 300 is able to monitor the status of the call. Once the call is completed, the method proceeds to step S716, where the call forwarding instructions are re-implemented. This ensures that further calls directed to the subscriber mobile telephony device 112 will be forwarded to the IP telephony system 124.

If the check made in step S704 indicated that the subscriber mobile telephony device 112 is not registered with the forwarding connection unit 300, then in step S720 a check is made to determine if it is acceptable to terminate the communication through the non-native mobile telephony service provider B 140. If the system determines that the call should not be terminated through non-native mobile telephony service provider B 140, then in step S728 the call would be terminated in some other fashion.

If the decision in step S720 is to terminate the call to the subscriber mobile telephony device 112 through a non-native mobile telephony service provider, then in step S722 the forwarding instruction unit 306 contacts mobile telephony service provider A 114 and cancels the call forwarding instructions. The call termination unit 308 then sends the call to the regular native telephone number of the subscriber mobile telephony device 112 in step S724. This will cause mobile telephony service provider A 114 to send the call on to mobile telephony service provider B 140, which ultimately completes the call to the subscriber mobile telephony device 112. Once the call is completed, the method proceeds to step S726, where the call forwarding instructions are re-implemented.

Figure 8:
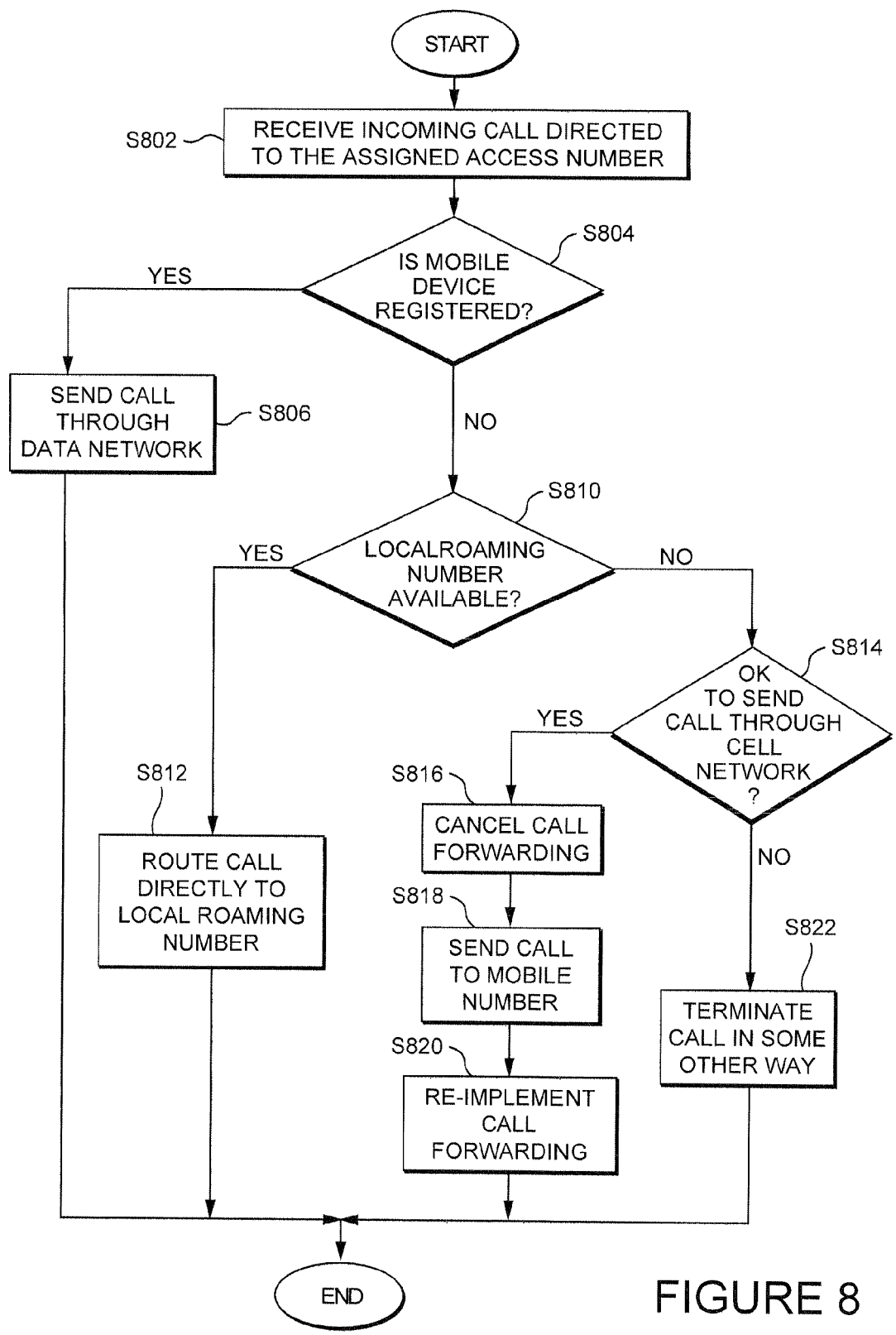
FIG. 8 is a diagram illustrating steps of another method embodying the invention for terminating telephony communications to a mobile telephony device.

FIG. 8 illustrates steps of another method embodying the invention. This method results in a telephony communication being terminated to a subscriber mobile telephony device 112 that is roaming. The call is completed through the non-native mobile telephony service provider B 140. However, the call is completed in a fashion that will not result in roaming charges.

When a mobile telephony device is located outside of its native calling area, the device will communicate with a non-native mobile telephony service provider. During an initial communication process, the non-native mobile telephony service provider will recognize that the mobile telephony device is a non-native device. As a result, the non-native mobile telephony service provider will assign a temporary local access telephone number to the device. The temporary number is often known as a mobile subscriber roaming number (MSRN). The non-native mobile telephony service provider then communicates with the user's native mobile telephony service provider and informs the native mobile telephony service provider of the assigned local access telephone number. This can be accomplished using a MAP Update Location Message.

The native mobile telephony service provider stores the temporary local access telephone number in a home location register that it maintains. The native mobile telephony service provider can obtain the temporary local access telephone number using a MAP Provide Roaming Number message. Whenever a call comes in for the subscriber's mobile telephony device, the native mobile telephony service provider forwards the call to the temporary local access telephone number. This will route the call to the non-native mobile telephony service provider, which then completes the call to the subscriber's mobile telephony device.

Because the local access number assigned to the subscriber mobile telephony device 112 by the non-native mobile telephony service provider B 140 is stored in the home location register of the native mobile telephony service provider A 114, this information may be available to the IP telephony system 124. For purposes of the following explanation, the subscriber mobile telephony device 112 is roaming in country 2, and mobile telephony service provider B 140 has assigned a local access number to the subscriber mobile telephony device 112. The forwarding connection unit 300 has obtained the local access number from the native mobile telephony service provider 114. Finally, forwarding instructions for the subscriber mobile telephony device have been implemented.

The method begins in step S802, when an incoming telephony communication directed to the subscriber mobile telephony device 112 is received by the IP telephony system 124. In step S804 a check is performed to determine if the subscriber mobile telephony device 112 is registered with the forwarding connection unit 300 and available over a data connection. If so, then in step S806 the call is completed to the subscriber mobile telephony device 112 over the data connection.

If the subscriber mobile telephony device is not available over a data connection, the method proceeds to step S810, where a check is performed to determine if the forwarding connection unit 300 has the local access number assigned by the non-native mobile telephony service provider B 140. If the local access number is available, in step S812 the forwarding connection unit 300 routes the call over a data network to a gateway located in country 2. The gateway in country 2 then contacts and hands the call off to the non-native mobile telephony service provider B 140. The non-native mobile telephony service provider B 140 then completes the call to the subscriber mobile telephony device 112.

The IP telephony system 124 already has multiple agreements in place with mobile telephony service providers in multiple countries. Those agreements allow the IP telephony system 124 to route calls over a data network to gateways located in various countries. Those gateways can then hand calls off to the mobile telephony service providers in those countries.

By routing the call over the data network until the call arrives in the desired country, and by having the non-native mobile telephony service provider then complete the call from a local gateway to the subscriber mobile telephony device 112, the call can be completed for a considerably lower cost than if the call was handled in a traditional manner, and roaming charges were incurred. The user would likely have to pay a small charge to terminate the call in this fashion. But the charge would be less than the cost of the roaming charges.

Returning now to FIG. 8, if the local access number is not available, in step S814 a check is made to determine if it is acceptable to terminate the communication in the traditional manner through the non-native mobile telephony service provider B 140. If the system determines that the call should not be terminated through the non-native mobile telephony service provider B 140, then in step S822 the call would be terminated in some other fashion.

If the decision in step S814 is to terminate the call to the subscriber mobile telephony device 112 in the traditional manner through the non-native mobile telephony service provider B 140, then in step S816 the forwarding instruction unit 306 contacts mobile telephony service provider A 114 and cancels the call forwarding instructions. The call termination unit 308 then sends the call to the regular native telephone number of the subscriber mobile telephony device 112 in step S818. This will cause mobile telephony service provider A 114 to send the call on to mobile telephony service provider B 140, which ultimately completes the call to the subscriber mobile telephony device 112. Once the call is completed, the method proceeds to step S820, where the call forwarding instructions are re-implemented.

As an additional feature of the call termination processes presented above, an enhanced security option is made available. That is, once a communication request is passed to the IP telephony system 124, call signaling and media connections between the IP telephony system 124 and the subscriber mobile telephony device 112 may be encrypted to provide a secure communication session. The encryption techniques that are used could be RSA encryption, as described in *PKCS#1 v2.1: RSA Cryptography Standard*, RSA Laboratories, dated Jun. 14, 2002, or AES encryption as described in *Advanced Encryption Standard (AES)*, Federal Information Processing Standards Publication 197, dated Nov. 26, 2001, or the techniques described in *Secure Socket Layer (now Transport Layer Security) Protocol, Version* 1.2 as described in IETF RFC 5246, dated August 2008, all of which are incorporated herein by reference.

In the methods described above, a call forwarding number or some other form of forwarding identifier is assigned by the forwarding connection unit 300 when call forwarding instructions are being implemented. This would likely result in different forwarding access telephone numbers being used for the same device at different times. However, in other embodiments, the forwarding access telephone number could be a dedicated telephone number that is used only for a particular mobile telephony device.

In the systems and methods described above, a forwarding instruction unit 306 of a forwarding connection unit 300 assigns a forwarding access telephone number and issues call forwarding instructions to mobile telephony service provider A 114. This causes mobile telephone service provider A 114 to forward all calls made to the native telephone number of the subscriber mobile telephony device 112 to the assigned forwarding access number.

In some cases, it may be impossible for the forwarding instruction unit 306 of a forwarding connection unit 300 to interact directly with a mobile telephony service provider to cause the mobile telephony service provider to implement and/or cancel call forwarding instructions. In those cases, however, it may be possible for call forwarding instructions to be implemented and canceled by issuing such instructions to the mobile telephony service provider from a subscriber's mobile telephony device. As will be explained below, in some embodiments, a software application running on a subscriber's mobile telephony device can cause call forwarding instructions to be issued from the subscriber's mobile telephony device. In other embodiments, the subscriber may need to take some type of positive action to cause appropriate call forwarding instructions to be issued from the subscriber's mobile telephony device.

Instructions to implement and cancel call forwarding can be issued to a mobile telephony service provider from a subscriber's mobile telephony device by dialing predetermined patterns of characters and/or numbers. The call forwarding activation and deactivation codes can vary from one mobile telephony service provider to the next. Thus, it is important to know which mobile telephony service provider is providing the native service to a subscriber's mobile telephony device to thereby know which string of characters must be dialed implement or cancel call forwarding instructions.

Also, many mobile telephony service providers allow for different types of call forwarding instructions. Some call forwarding instructions can be unconditional, whereas other call forwarding instructions can be conditional based on various factors. For example, in many mobile telephony systems a first call forwarding activation code causes all calls placed to the native telephone number of a subscriber's mobile telephony device to be forwarded to a specified forwarding telephone number. A second call forwarding activation code causes a call placed to the native telephone number of a subscriber's mobile telephony device to be forwarded to a specified forwarding telephone number only if the subscriber's mobile telephony device is already busy with another call. A third call forwarding activation code causes calls to the native telephone number of a subscriber's mobile telephony device to be forwarded to a forwarding telephone number only if the call is not answered by the subscriber's mobile telephony device within a certain period of time after ringing begins.

As with the call forwarding activation codes, different deactivation codes may be required to deactivate each of these different types of call forwarding instructions. The deactivation codes may also vary from one mobile telephony service provider to the next.

Most subscribers are not aware of the codes that must be dialed on their mobile telephony device to activate and deactivate call forwarding. Also, in many systems and methods embodying the invention, the call forwarding number that is assigned by the forwarding connection unit 300 will not be known until it is actually issued by the forwarding connection unit 300. And that may not occur until the subscriber's mobile telephony device registers with the forwarding connection unit 300 via a data connection.

For these reasons, if it is necessary for a subscriber to issue call forwarding instructions to the mobile telephony service provider by dialing a particular string of characters on the subscriber's mobile telephony device, it is helpful for the forwarding connection unit 300 to provide the subscriber, or an application on the subscriber's mobile telephony device, with the string of characters that must be dialed. Several different ways of accomplishing this task are explained below.

In many mobile telephony systems, a subscriber can cause unconditional call forwarding to be implemented by dialing the string "*21*[forwarding telephone number]#". The forwarding telephone number is the telephone number to which calls will be forwarded. In the United States, the forwarding telephone number typically includes 10 digits, including the area code and the assigned telephone number. Once unconditional call forwarding instructions have been implemented, they can be canceled by dialing the string "##21#".

In many of those same mobile telephony systems, several different types of conditional call forwarding can be implemented by dialing different strings of characters. For example, some telephony systems can be instructed to forward a call to a forwarding telephone number if the subscriber's mobile telephony device is busy with another call by dialing the character string "*67*[forwarding telephone number]#". This type of conditional call forwarding can be canceled by dialing the character string "##67#". Other types of conditional call forwarding can be implemented and canceled by dialing other character strings.

In the context of this invention, the point of issuing call forwarding instructions is to cause a subscriber's native mobile telephony service provider to forward an incoming call directed to the native telephone number of the subscriber's mobile telephony device to be forwarded to a forwarding access number that has been assigned by a forwarding connection unit 300 of an IP telephony system 124. Once the incoming call is re-directed to the forwarding access number, the IP telephony system 124 completes the call to the subscriber's mobile telephony device over a data connection. This requires that the subscriber's mobile telephony device already be registered with the forwarding connection unit 300 via a data connection.

If the forwarding instruction unit 306 of a forwarding connection unit 300 is unable to interact directly with the subscriber's native mobile telephony service provider to cause the implementation and cancellation of call forwarding instructions, then it would be advantageous for such call forwarding instructions to be issued by dialing the appropriate character string from the subscriber's mobile telephony device. Typically, the call forwarding instructions would be issued from the subscriber's mobile telephony device shortly after the subscriber's mobile telephony device registers with a registration unit 302 of the forwarding connection unit 300. If a forwarding access telephone number is selected upon registration, this is the earliest point in time at which the forwarding access telephone number will be known.

In the following example, the forwarding connection unit 300 provides the subscriber, or an application on the subscriber's mobile telephony device, with a character string that must be dialed from the subscriber's mobile telephony device to implement appropriate call forwarding instructions. In some instances, the subscriber then causes that character string to be dialed to implement the call forwarding instruction. In other instances, an application on the subscriber's mobile telephony device causes the character string to be dialed to implement the call forwarding instructions.

Figure 9:
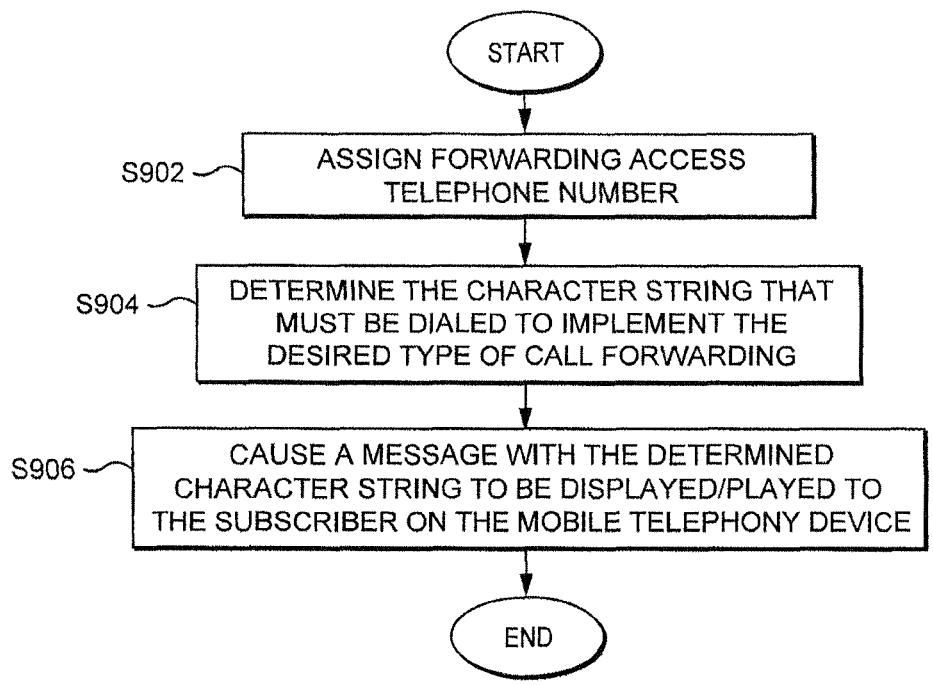
FIG. 9 is a flowchart describing a method in which a character string that can be dialed to implement call forwarding is determined and provided to a telephony device.

FIG. 9 illustrates steps of a method that would be performed when a subscriber's mobile telephony device registers with a forwarding connection unit 300 to implement forwarding procedures by dialing a character string from the subscriber's mobile telephony device. As explained above, in some embodiments, the subscriber's mobile telephony device automatically contacts the forwarding connection unit 300 whenever it is able to establish a data connection, regardless of how that connection is established. In other instances, the subscriber takes direct action to cause his mobile telephony device to register with the forwarding connection unit 300. In still other instances, the forwarding connection unit may initiate contact to the subscriber's mobile telephony device to cause registration to occur.

The method begins in step S902, where the forwarding instruction unit 306 assigns a forwarding access telephone number for the subscriber's mobile telephony device. As explained above, the forwarding access telephone number is stored in a registration database maintained by the IP telephony system 124 against the native telephone number and the IMSI number of the subscriber's mobile telephony device.

Once the forwarding access number is assigned, in step S904 the forwarding instruction unit 306 determines the string of characters which must be dialed from the subscriber's mobile telephony device to instruct the subscriber's native mobile telephony service provider to implement the desired type of call forwarding.

As explained above, different codes are used by different mobile telephony service providers to implement and cancel the same type of call forwarding instructions. Thus, the forwarding instruction unit 306 needs to know what mobile telephony service provider is providing the native mobile telephony service to the subscriber's telephony device so that the correct character string can be determined. In some embodiments, a call forwarding code database 310 containing the codes or character strings that are used by various different mobile telephony service providers to implement and cancel various different types of call forwarding is part of the forwarding connection unit 300, or part of the IP telephony system 124. The call forwarding instruction unit would consult this database to obtain information about how to determine the correct character string.

As also explained above, many mobile telephony service providers are capable of implementing multiple different types of call forwarding, each of which is implemented and canceled by different character strings. Thus, the forwarding instruction unit 306 also needs to determine what type of call forwarding the subscriber wishes to implement, and then determine the character string to use to implement the desired type of call forwarding within the subscriber's mobile telephony service provider system.

In some embodiments, the subscriber's preferences about the type of call forwarding will already have been provided to the forwarding connection unit 300 during a registration process. In other instances, the subscriber may be queried about the type of call forwarding he would like to implement each time that the subscriber's mobile telephony device registers with the forwarding connection unit 300. In some embodiments, if the subscriber has not made a selection regarding the type of call forwarding instructions he wishes to implement, the forwarding connection unit 300 selects a default type of call forwarding, such as unconditional call forwarding.

Once the forwarding instruction unit 306 has determined the character string that must be dialed to implement the desired type of call forwarding to the assigned forwarding access number, in step S906, the forwarding instruction unit 306 provides the determined character string to the subscriber and/or to the subscriber's mobile telephony device in any one of multiple different ways. In some embodiments, the forwarding instruction unit 306 causes a message to be displayed on the subscriber's mobile telephony device. The message includes the determined character string. The message may also include instructions for dialing the determined character string.

In some embodiments, the message could be sent to a software application that is running on the subscriber's mobile telephony device, or that is present on a memory card or SIM card of the device, and which is in communication with the forwarding instruction unit 306 via a data connection. The software application then causes the message to be displayed on the subscriber's mobile telephony device. In other embodiments, the forwarding instruction unit 306 could cause a SMS or MMS message to be sent to the subscriber's mobile telephony device via a telephony system connection. In still other embodiments, a push notification service could be used to send the desired message to the user's mobile telephony device.

In the example given above, the character string "*21*[forwarding telephone number]#" is used to implement unconditional call forwarding to the forwarding telephone number. If the forwarding access number assigned by the forwarding instruction unit 306 is 703.555.1234, the message sent to the subscriber's mobile telephony device would include the string "*21*7035551234#". The subscriber would dial that character string from his mobile telephony device to implement call forwarding to the telephone number 703.555.1234.

In some instances, it may be relatively easy for the subscriber to copy the provided character string, and to then insert that copied character string into the native telephone dialer of the subscriber's mobile telephony device. In other instances, the subscriber's mobile telephony device may have functionality that allows the subscriber to highlight or select the character string in the displayed message, and to then cause the mobile telephony device to dial the highlighted/selected character string. In such instances, it will be relatively easy for the subscriber to cause his mobile telephony device to dial provided character string to cause the implementation of call forwarding instructions.

One type of call forwarding activation code causes calls to the native telephone number of a subscriber's mobile telephony device to be forwarded to a forwarding telephone number if the call is declined by the subscriber (e.g., by pressing decline when the call is first received by the mobile telephony device and the mobile telephony device begins ringing). This fourth type of call forwarding activation code may be advantageous in allowing the subscriber to choose how an incoming call is ultimately connected to his mobile telephony device.

For example, in some instances, a subscriber may find that he experiences superior call quality using a cellular telephony channel, as opposed to a data channel. Thus, depending upon the nature of the phone call, the user may prefer that an incoming call be connected to his mobile telephony device via a cellular telephony channel, which would incur roaming charges, as opposed to receiving the call through a data network via an assigned call forwarding number.

If conditional call forwarding instructions are issued to the subscriber's native mobile telephony service provider that only result in a call being forwarded to a forwarding access number if the subscriber declines an incoming call, the subscriber will be able to choose how the call is connected to his mobile telephony device. If the subscriber simply answers an incoming telephone call when his mobile telephony device begins to ring, the call will be connected to the subscriber's mobile telephony device via a roaming cellular connection, which might provide higher call quality. On the other hand, if the subscriber declines the call, the subscriber's native mobile telephony service provider will forward the call to a forwarding access number assigned by the forwarding connection unit 300, and the call will be routed to the subscriber's mobile telephony device via a data connection, as described above.

Figure 10:
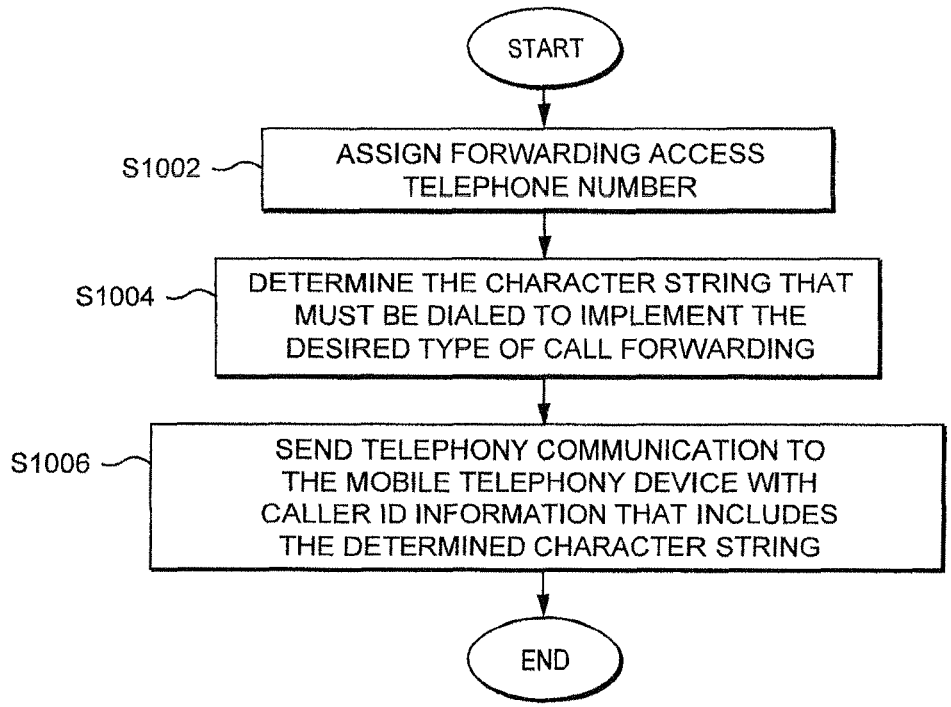
FIG. 10 is a flowchart describing another method in which in which a character string that can be dialed to implement call forwarding is determined and provided to a telephony device.

FIG. 10 illustrates a method in which the forwarding instruction unit 306 sends a character string that is to be used to implement call forwarding to a subscriber's mobile telephony device in a way that makes it easy for the subscriber to dial the provided string. In step S1002, the forwarding instruction unit 306 assigns a forwarding access telephone number. Once the forwarding access telephone number is assigned, the forwarding instruction unit 306 determines the character string that must be dialed from the subscriber's mobile telephony device to implement a desired type of call forwarding to the assigned forwarding access number in step S1004. In step S1006, the forwarding instruction unit 306 provides the character string to the subscriber's mobile telephony device in a manner that allows the character string to be recorded as part of a contact in a contact list that is present on the subscriber's mobile telephony device.

In some embodiments, the forwarding instruction unit 306 causes a telephone call or a SMS/MMS message to be sent to the subscriber's mobile telephony device. The call or SMS/MMS message includes user ID information. The user ID information includes the determined character string as the "telephone number" of the calling party. The name provided in the caller ID information could provide an indication of the function of the character string. For example, the name in the caller ID information could read "Implement Call Forwarding for Mobile Roaming."

When the call or message is received by the subscriber's mobile telephony device, the caller ID information that includes the determined character string, and possibly a label indicating the purpose of the character string, will be recorded in the incoming call log of the subscriber's mobile telephony device. Many mobile telephony devices provide the subscriber with the ability to use the caller ID information that has been captured for an incoming telephony communication to populate a new contact entry in a contact list that is stored on the subscriber's mobile telephony device. Thus, the subscriber is able to store a new contact in his contact list that includes the character string that must be dialed to implement call forwarding as the "telephone number" of the new contact. Likewise, the name in the caller ID information, which can include a label indicating the purpose of the character string, will appear as the name of the new contact.

Once the new contact has been stored on the subscriber's mobile telephony device, the subscriber can request that a call be placed to that contact. This would cause the subscriber's mobile telephony device to dial the character string which implements the required type of call forwarding.

The forwarding instruction unit 306 could also place multiple calls or send multiple messages to the subscriber's mobile telephony device to deliver character strings and corresponding labels for multiple different types of call forwarding instructions. For example, the forwarding instruction unit 306 could place a first call to the subscriber's mobile telephony device with a character string used to implement unconditional call forwarding to an assigned forwarding access number. The subscriber would cause this first character string to be stored as part of a first new contact under the name "Implement Unconditional Call Forwarding." The forwarding instruction unit 306 could then place a second call to the subscriber's mobile telephony device with the character string used to implement a type of conditional call forwarding to the assigned forwarding access number which occurs only if the subscriber's mobile telephony device is busy, or if the subscriber declines an incoming call. The subscriber would cause this second character string to be stored as part of a second new contact under the name "Implement Conditional Call Forwarding." The subscriber could then choose which type of call forwarding is to be implemented by placing a call to the contact which causes the desired type of call forwarding instructions to be implemented.

In the same way that a character string can be stored as a contact that is used to implement a desired form of call forwarding, a contact with a character string that is dialed to cancel call forwarding could also be stored on the subscriber's mobile telephony device under a name such as "Cancel Call Forwarding." As noted above, in some mobile telephony service provider systems, the character string "##21#" can be dialed from a mobile telephony device to cancel unconditional call forwarding. Thus, the forwarding instruction unit 306 could send a call or a message to the subscriber's mobile telephony device that includes caller ID information including the character string "##21#" as the source telephone number, and "Cancel Unconditional Call Forwarding" as the name. The subscriber could then create a new contact with this information. And once created, the subscriber could simply request that a call be placed to the contact with the name "Cancel Unconditional Call Forwarding" to cause his mobile telephony device to dial the character string which causes the cancellation of unconditional call forwarding.

Because the character string used to cancel call forwarding instructions does not typically include a telephone number, it would be possible for a subscriber to store contacts having the character strings for cancellation of each type of call forwarding instructions. Those contacts could then be re-used multiple times whenever a subscriber wishes to cancel a particular type of call forwarding.

On the other hand, if a new call forwarding access number is assigned to a subscriber's mobile telephony device each time the mobile telephony device registers with the forwarding connection unit 300, it would be necessary for the subscriber to store a new contact in his contact list (with a character string that includes the newly assigned forwarding access telephone number) each time that the mobile telephony device re-registers with the forwarding connection unit 300. It is unlikely that a previously stored contact could be re-used to implement forwarding operations at a later point in time, because at that later point in time a new forwarding access number will have been assigned to the subscriber's mobile telephony device. And that new forwarding access telephone number will not be reflected in the telephone number information that is present in the first contact that was stored in the subscriber's contact list.

However, if the forwarding connection unit 300 assigns a static forwarding access number to the subscriber's mobile telephony device for an enduring period of time, the subscriber could store a contact in his contact list having a telephone number that is the character string including the static forwarding access number. That contact could be re-used multiple times by the subscriber to implement call forwarding instructions. Software on the subscriber's mobile telephony device could automatically create the contact.

For example, assume that a subscriber travels to another country on business, that country being outside the subscriber's native telephony service area, and the subscriber intends to remain in the country for a week. Under those circumstances, the forwarding connection unit 300 could assign a forwarding access number to the subscriber's mobile telephony device that will remain tied to the mobile telephony device for the entire week. A first contact including the character string for implementing call forwarding to the assigned forwarding access number could then be stored on the subscriber's mobile telephony device. A second contact having the character string used to cancel those call forwarding instructions could also be stored on the subscriber's mobile telephony device. This would allow the subscriber to selectively implement and cancel call forwarding instructions (and thus, forwarding operations) by requesting that calls be placed to the first and second stored contacts over the duration of his visit to the foreign country.

In the systems and methods described above in connection with FIGS. 9 and 10, it was assumed that the forwarding connection unit 300 was unable to interact directly with the mobile telephony service provider that provides telephony service to a subscriber's mobile telephony device to selectively implement and cancel call forwarding instructions. For this reason, in the systems and methods discussed above, the character strings required to implement and cancel call forwarding instructions are provided to the subscriber, via his mobile telephony device. The subscriber directly interacts with his device to selectively implement and cancel call forwarding instructions (and thus forwarding operations).

Unfortunately requiring the subscriber to implement and cancel call forwarding instructions is not ideal. Some subscriber will likely view this as inconvenient and/or too difficult. Also, there is a danger that a subscriber may implement call forwarding instructions (to implement forwarding operations), and then forget to cancel the call forwarding instructions once forwarding operations are longer needed or desired.

In other situations, the subscriber may not be aware when his mobile telephony device can no longer maintain a data connection with the forwarding connection unit 300. If that occurs, the subscriber may not even be aware that he should cancel call forwarding instructions so that incoming calls can be received (albeit in a more expensive fashion) via a normal cellular connection.

For all these reasons, in some situations it is desirable for the implementation and cancellation of call forwarding instructions to be performed automatically at the appropriate times. However, as also explained above, in some situations the only way to implement and cancel call forwarding instructions is have the subscriber's mobile telephony device dial a particular character string.

Figure 11:
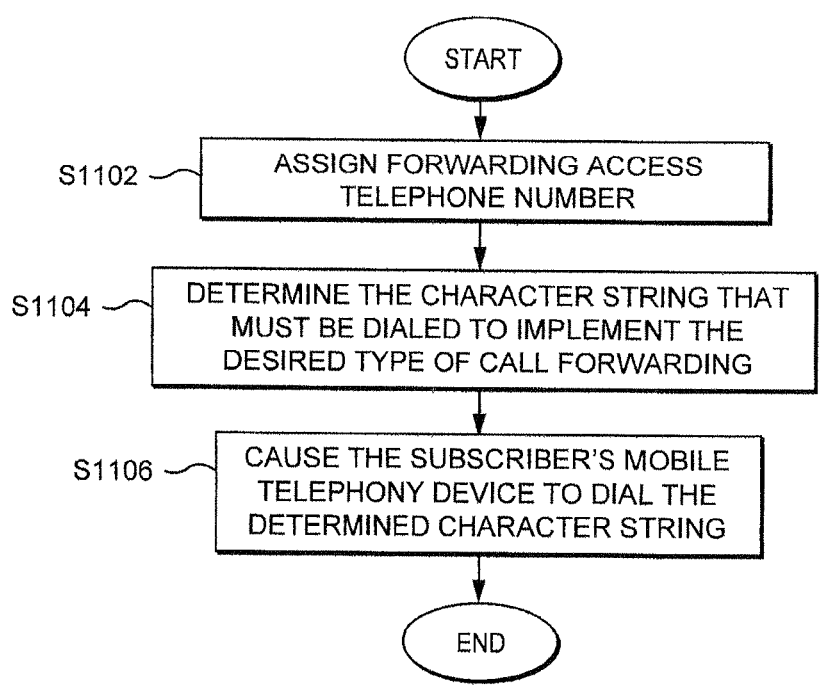
FIG. 11 is a flowchart describing a method in which a mobile telephony device is caused to dial a character string that causes the implementation of call forwarding instructions

FIG. 11 illustrates steps of a method where call forwarding instructions can be automatically implemented and canceled, without requiring the user to take any active steps, even through a character string must be dialed by the subscriber's mobile telephony device to implement and cancel the call forwarding instructions. In step S1102, the forwarding instruction unit 306 assigns a forwarding access telephone number. Once the forwarding access telephone number is assigned, in step S1104 the forwarding instruction unit 306 determines the character string that must be dialed from the subscriber's mobile telephony device to implement the desired type of call forwarding to the assigned forwarding access number.

In step S1106, the forwarding instruction unit 306 causes the subscriber's mobile telephony device to dial the determined character string. In some embodiments, it may be possible for the forwarding instruction unit 306 to interact directly with the subscriber's mobile telephony device via a data connection to cause the native dialer of the subscriber's mobile telephony device to dial the determined character string. In other embodiments, the forwarding instruction unit 306 may provide the character string to an application that is present on the subscriber's mobile telephony device, along with a direction to cause the character string to be dialed. The application would then cause the native dialer on the subscriber's mobile telephony device to dial the character string.

In a similar fashion, the forwarding instruction unit 306 can determine a character string that will cause call forwarding to be canceled, and the forwarding instruction unit 306 can cause the native dialer on the subscriber's mobile telephony device to dial the character string that cancels call forwarding. This could occur because the forwarding instruction unit 306 is able to interact directly with the native dialer via a data connection, or because the forwarding instruction unit 306 instructs an application on the subscriber's mobile telephony device to cause the dialing of the cancellation string.

In alternate embodiments, the forwarding instruction unit 306 may contact and/or control the native dialer of the user's mobile telephony device through a connection via a cellular data channel, as opposed some other type of data connection. The forwarding instruction unit 306 might also provide instructions to an application running on the subscriber's mobile telephony device via the cellular data connection.

In still other embodiments, the forwarding instruction unit 306 may provide instructions to an application running on the subscriber's mobile telephony device via a push notification. For example, the forwarding instruction unit 306 may cause a push notification to be sent to the subscriber's mobile telephony device that includes the message "Would you like to implement forwarding operations?" If the user responds affirmatively, a message would be delivered to an application on the subscriber's mobile telephony device that causes the application to access and control the native dialer on the subscriber's mobile telephony device so that a character string is dialed to implement call forwarding to an assigned forwarding access number. In some instances, the push notification will also cause the application to load and run. Similar push notifications could be used in a similar fashion to cause the cancellation of call forwarding instructions, and thus the termination of forwarding operations.

In many of the foregoing descriptions, instructions were provided to a software application running on a subscriber mobile telephony device 112, or instructions or communications were received from such an application. Also, in some of the foregoing examples, a software application on a subscriber mobile telephony device 112 takes various actions, such as displaying messages to a user, reporting the current location of the subscriber mobile telephony device 112, causing a forwarding connection unit 300 to implement or cancel call forwarding instructions, or instructing a native dialer of the subscriber mobile telephony device to dial character strings used to implement and cancel call forwarding instructions.

In alternate embodiments of the invention, a browser running on the subscriber mobile telephony device 112 may access a software application that is running on some other device via a data network connection. The software application could be running on a remote server that is accessible via a data network connection. The software application running elsewhere, and accessible via a browser on the subscriber mobile telephony device 112 may provide all of the same functionality as an application running on the subscriber mobile telephony device itself 112. Thus, any references in the foregoing description and the following claims to an application running on the subscriber mobile telephony device 112 are intended to also encompass embodiments and implementations where a browser running on the subscriber mobile telephony device 112 accesses a software application running elsewhere via a data network.

In the embodiments discussed above, either the forwarding connection unit 300 of an IP telephony system 124 or a telephony device 112 provided instructions to a mobile telephony service provider 114 to cause the mobile telephony service provider 114 to implement and cancel call forwarding instructions. In alternate embodiments, a third party forwarding agent is responsible for causing a mobile telephony service provider to implement and canceling call forwarding instructions.

Figure 12:
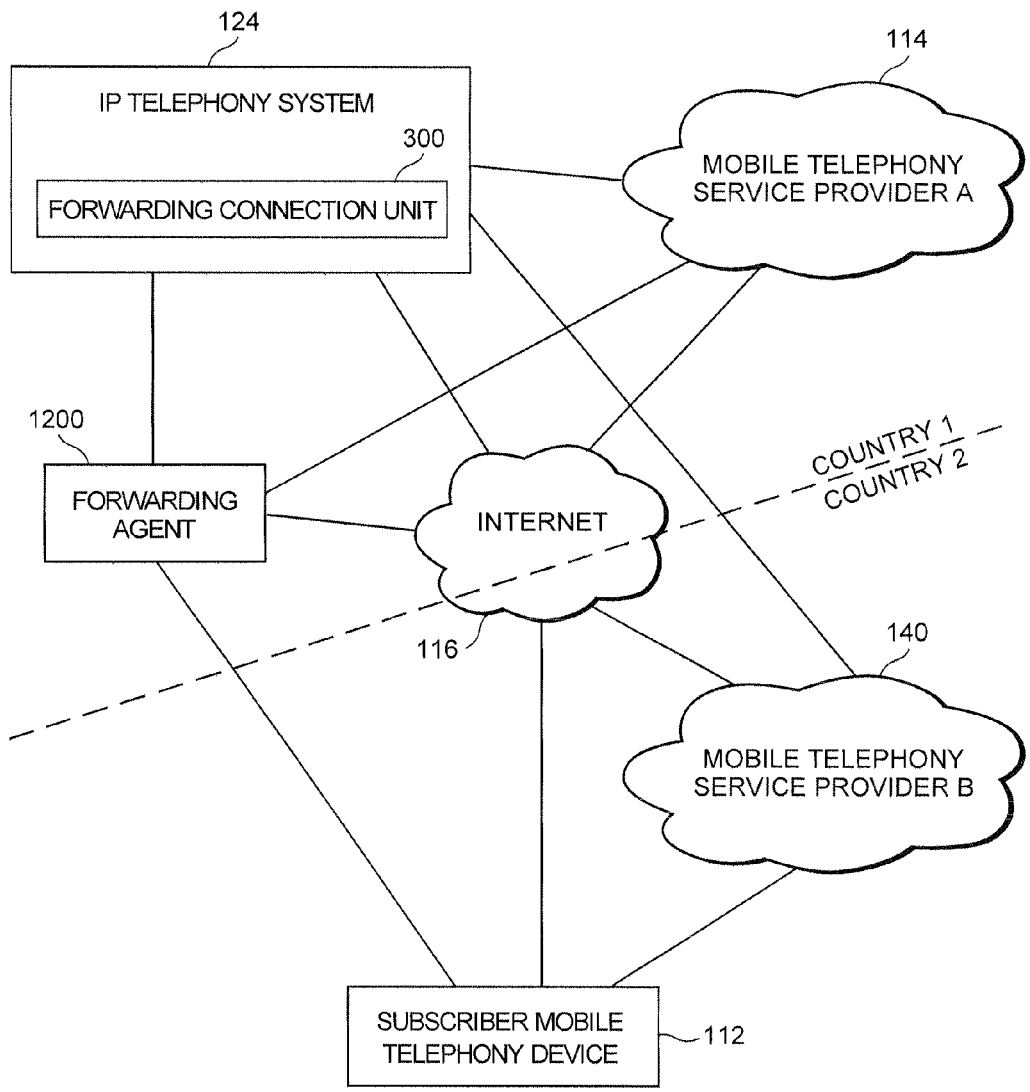
FIG. 12 is block diagram illustrating elements of a communications environment which can be used to implement and cancel call forwarding termination procedures.

FIG. 12 illustrates elements of a communications environment which includes a forwarding agent 1200. The communications environment also includes an IP telephony system 124 having a forwarding connection unit 300. Mobile telephony service provider A 114 provides a subscriber mobile telephony device 112 with its native telephony service. However, when the subscriber mobile telephony device 112 is located outside its native service area, such as in country 2, mobile telephony service provider B 140 can connect telephony communications to the subscriber mobile telephony device 112. Alternatively, telephony communications can be terminated to the subscriber mobile telephony device 112 through a data network, such as the Internet 116, by the forwarding connection unit 300 of the IP telephony system 124.

The forwarding agent 1200 can be implemented as a network server or a general purpose computer running appropriate software. The forwarding agent 1200 receives instructions from a forwarding connection unit 300 of an IP telephony system 124 and/or from a telephony device 112, the instructions requesting that the forwarding agent 1200 cause a mobile telephony service provider 114 to implement or cancel forwarding instructions. Upon receipt of those instructions, the forwarding agent 1200 contacts the mobile telephony service provider 114 and requests that call forwarding instructions be implemented or canceled for a particular telephony device.

In some embodiments, the forwarding agent 1200 is controlled by an entity that is completely separate from the IP telephony system 124. In other embodiments, the forwarding agent 1200 may be controlled by the IP telephony system 124.

Figure 13:
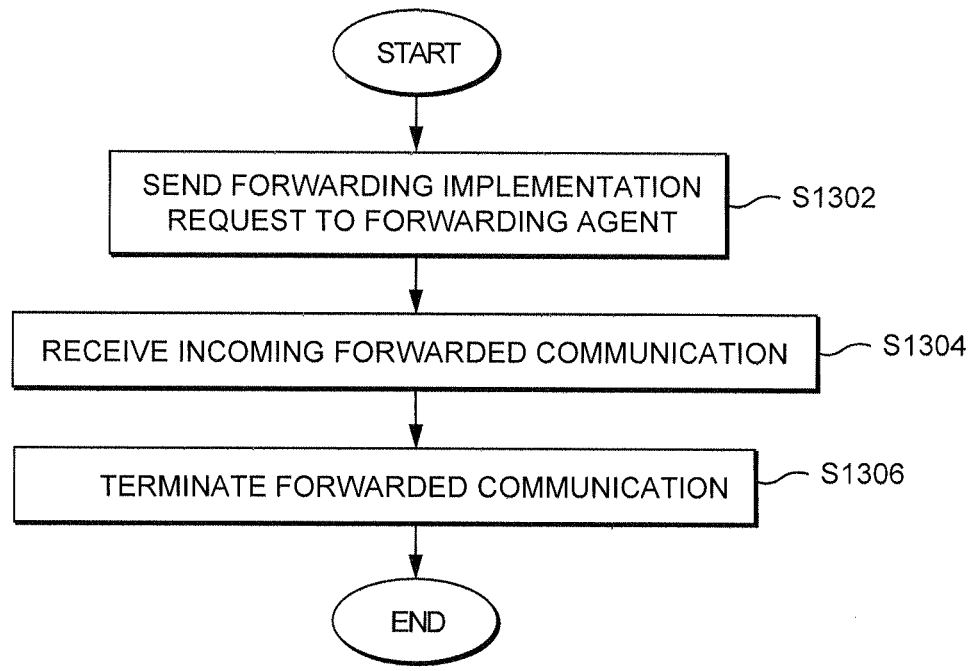
FIG. 13 is a flowchart illustrating steps of a method of implementing and performing call forwarding termination procedures using a forwarding agent.

FIG. 13 illustrates steps of a method of implementing and conducting call forwarding termination procedures involving a forwarding agent 1200. As illustrated in FIG. 13, the method begins and proceeds to step S1302, where a request to implement call forwarding instructions for a subscriber telephony device 112 is sent to a forwarding agent 1200. The request could originate from a forwarding connection unit 300 of an IP telephony system 124, or from the telephony device 112 itself. In either instance, the request could include both the native telephone number of the telephony device 112, as well as the forwarding telephone number to which calls should be forwarded. The request could include additional information identifying the telephony device 112, such as an IMSI number associated with the telephone device 112, or a SIM card present in the telephony device 112.

In some embodiments, the forwarding number to which calls are to be forwarded will be assigned by the forwarding connection unit 300. In this situation, the request sent to the forwarding agent 1200 would include the assigned forwarding access number.

In alternate embodiments, the forwarding access number that is to be used may be assigned by the forwarding agent 1200. For example, the forwarding agent may be informed of a block of telephone numbers that can be used as forwarding access numbers in advance. When a request to cause forwarding instructions to be implemented is received from the forwarding connection unit 300 of an IP telephony system 124, or from a telephony device 112, the forwarding agent 1200 selects one of the forwarding telephone numbers from the block of available numbers. The forwarding agent 1200 then causes the mobile telephony service provider 114 to implement call forwarding instructions so that incoming calls directed to the telephony device's native telephone number are forwarded to the selected forwarding access telephone number.

In this situation, the forwarding agent 1200 sends a message back to either or both of the forwarding connection unit 300 and telephony device 112 to inform them of the forwarding access number that was assigned to the telephony device 112. This ensures that when an incoming telephony communication is received by the IP telephony system 124 on the assigned forwarding access telephone number, the IP telephony system 124 knows which telephony device 112 that the call should be terminated to via a data network.

The method illustrated in FIG. 13 then moves on to step S1304 where the IP telephony system 124 receives an incoming telephony communication on the assigned forwarding access telephone number. Then, in step S1306, the IP telephony system 124 terminates the incoming telephony communication in accordance with predetermined instructions. As described above in the foregoing examples, this could include terminating the telephony communication to the telephony device 112 via a data network, terminating the telephony communication via non-native mobile telephony service provider B 140, sending the telephony communication to a voicemail system, forwarding the telephony communication to an alternate telephone number, as well as other termination options. Subsequently, the method ends.

A method as illustrated in FIG. 13 uses the forwarding agent 1200 to cause the mobile telephony service provider 114 to implement and cancel call forwarding instructions. Thus, neither the forwarding connection unit 300 nor the telephony device 112 need to directly interact with the mobile telephony service provider 114 to cause the implementation and cancellation of the forwarding instructions.

Figure 14:
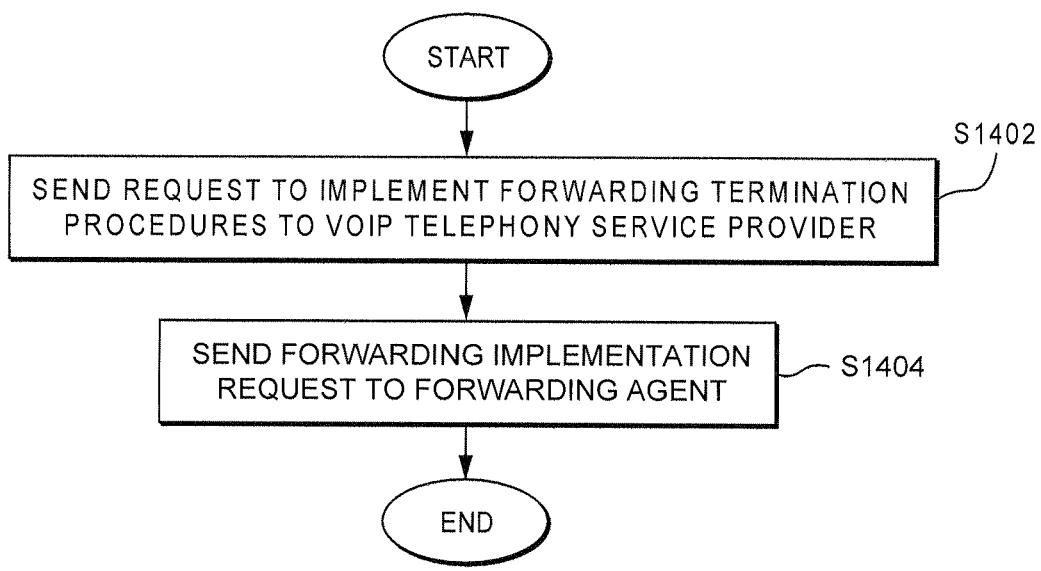
FIG. 14 is a flowchart illustrating steps of a first method that would be performed by a telephony device to cause the implementation of call forwarding termination procedures.

FIG. 14 illustrates steps of a method that would be performed by a subscriber mobile telephony device 112 to cause the implementation of call forwarding termination procedures. The method begins and proceeds to step S1402, where the telephony device 112 sends a message to the forwarding connection unit 300 of an IP telephony system 124 that requests that forwarding termination procedures be implemented. This could occur because an application on the telephony device 112 determined that the telephony device 112 was roaming outside its native service area, because a user specifically requested that forwarding termination procedures be implemented, or for a variety of other reasons.

In step S1404, the telephony device 112 sends a message to a forwarding agent 1200 requesting that the forwarding agent 1200 cause the telephony device's native mobile telephony service provider 114 to implement call forwarding instructions. Once the forwarding agent 1200 acts, incoming telephony communications directed to the telephony device's native telephone number will be forwarded to the IP telephony system 124, which can terminate the telephony communication according to predetermined instructions, as discussed above. Subsequently, the method ends.

In some embodiments, when the forwarding connection unit 300 receives a request from the telephony device 112 to implement call forwarding termination procedures, the forwarding connection unit 300 selects a forwarding access telephone number, and provides that forwarding access telephone number back to the telephony device 112. The message sent from the telephony device 112 to the forwarding agent 1200 will then include the assigned forwarding access telephone number. The forwarding agent 1200 uses this information to cause the mobile telephony service provider 114 to implement the correct forwarding instructions.

In alternate embodiments, the forwarding connection unit 300 may assign the forwarding access telephone number, but send a message directly to the forwarding agent 1200 indicating the forwarding access telephone number that has been assigned to the telephony device 112.

In still other embodiments, when the telephony device 112 sends a message to the forwarding agent 1200 asking for the forwarding agent 1200 to cause the mobile telephony service provider 114 to implement call forwarding instructions, the forwarding agent 1200 selects the forwarding access telephone number. Here again, the forwarding agent 1200 may have previously been provided with a block of forwarding numbers that are available for this purpose. In this situation, the forwarding agent 1200 could contact the IP telephony system 124 to inform the IP telephony system 124 of the forwarding access telephone number that has been assigned to the telephony device 112. Alternatively, the forwarding agent 1200 may send a message back to the telephony device 112 to inform it of the assigned forwarding access telephone number, and the telephony device 112 can relay this information to the IP telephony system 124.

When it is necessary or desirable for call forwarding termination procedures to be canceled, the telephony device 112 could send a message to the IP telephony system 124 informing the IP telephony system 124 that forwarding termination procedures are to be canceled. Likewise, the telephony device 112 can send a message to the forwarding agent 1200 requesting that the forwarding agent 1200 cause the mobile telephony service provider 114 to cancel the previously implemented call forwarding procedures.

Figure 15:
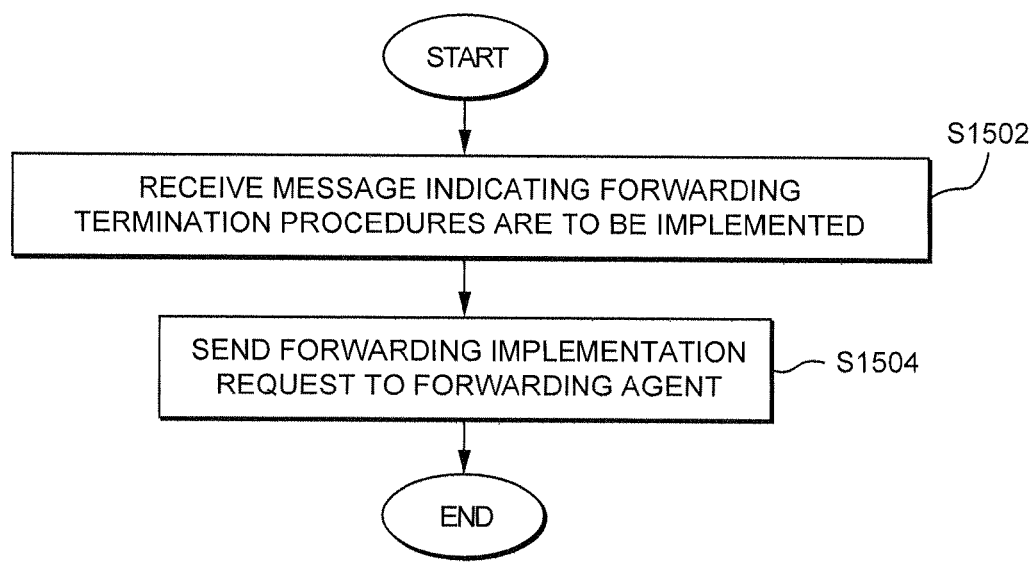
FIG. 15 is a flowchart illustrating steps of a second method that would be performed by a telephony device to cause the implementation of call forwarding termination procedures.

FIG. 15 illustrates an alternate method of implementing call forwarding termination procedures where the telephony device 112 interacts with the forwarding agent 1200. This method begins and proceeds to step S1502, where a telephony device 112 receives a message from the forwarding connection unit 300 of an IP telephony system 124 indicating that call forwarding termination procedures are to be implemented. This could occur because the call forwarding termination unit 300 determined that the telephony device 112 has roamed out of its native service area, or for other reasons, as discussed above. Then, in step S1504, the telephony device 112 sends a message to the forwarding agent 1200 asking the forwarding agent 1200 to cause the mobile telephony service provider 114 to implement call forwarding instructions.

In some embodiments, the message the telephony device 112 receives from the forwarding connection unit 300 will include a forwarding access telephone number that has been assigned by the forwarding connection unit 300. In this situation, the message that the telephony device 112 sends to the forwarding agent 1200 will include the forwarding access telephone number.

In other embodiments, the forwarding agent 1200 may assign the forwarding access telephone number. In this situation, the forwarding agent 1200 may send a message directly to the IP telephony system 124 to inform it of the forwarding access telephone number that has been assigned for the telephony device 112. Alternatively, the forwarding agent 1200 may send a message to the telephony device 112 with the assigned forwarding access telephone number, and the telephony device 112 will forward the number to the IP telephony system.

When it is desirable or necessary to cancel the call forwarding termination procedures, the call termination unit 300 may send another message to the telephony device 112 to inform the telephony device 112 that call forwarding termination procedures are to be canceled. The telephony device 112 then sends a message to the forwarding agent 1200 to request that the forwarding agent 1200 cause the mobile telephony service provider 114 to cancel the previously implemented call forwarding instructions.

In the methods illustrated in FIGS. 14 and 15, the telephony device 112 issues requests to the forwarding agent 1200 to request that call forwarding instructions be implemented and canceled by the mobile telephony service provider 114. But the forwarding agent 1200 is the entity that directly interacts with the mobile telephony service provider 114 to cause that to happen.

While foregoing is directed to embodiments of the present invention, other and further embodiments of the invention may be devised without departing from the basic scope thereof, and the scope thereof.

The invention claimed is:

1. A method performed by a telephony device for facilitating the termination of telephony communications to the telephony device, the telephony device being assigned a native identifier and being associated with a native telephony service provider, the method comprising:

sending, from the telephony device to a voice over Internet protocol (VOIP) telephony service provider, a request to implement forwarding termination procedures; and sending, from the telephony device to a forwarding agent, a request that results in the native telephony service provider forwarding incoming telephony communications directed to the native identifier to a forwarding identifier.

2. The method of claim 1, wherein the request sent to the forwarding agent asks the forwarding agent to cause the native telephony service provider to implement forwarding instructions that result in the native telephony service provider forwarding incoming telephony communications directed to the native identifier to a forwarding identifier.

3. The method of claim 1, further comprising receiving, from the VOIP telephony service provider, an indication of a forwarding identifier that has been assigned to the telephony device, wherein the request sent to the forwarding agent includes the assigned forwarding identifier.

4. The method of claim 1, further comprising:

receiving, from the forwarding agent, an indication of a forwarding identifier that has been assigned to the telephony device; and sending a message to the VOIP service provider that includes the assigned forwarding identifier.

5. A method performed by a telephony device for facilitating the termination of telephony communications to the telephony device, the telephony device being assigned a native identifier and being associated with a native telephony service provider, the method comprising:

receiving at the telephony device, a message from a voice over Internet protocol (VOIP) telephony service provider, the message indicating that forwarding termination procedures are to be implemented; and sending, from the telephony device to a forwarding agent, a request that results in the native telephony service provider forwarding incoming telephony communications directed to the native identifier to a forwarding identifier.

6. The method of claim 5, wherein the request asks the forwarding agent to cause the native telephony service provider to implement forwarding instructions that result in the native telephony service provider forwarding incoming telephony communications directed to the native identifier to a forwarding identifier.

7. The method of claim 6, wherein the message received from the VOIP telephony service provider includes the forwarding identifier, and wherein the request sent to the forwarding agent includes the forwarding identifier.

8. The method of claim 6, further comprising:

receiving at the telephony device, a message from the forwarding agent, message including the forwarding identifier; and sending, from the telephony device to the VOIP telephony service provider, a message that includes the forwarding identifier.

9. A system resident on a telephony device for facilitating the termination of telephony communications to the telephony device, the telephony device being assigned a native identifier and being associated with a native telephony service provider, the system comprising:

means for sending, from the telephony device to a voice over Internet protocol (VOIP) telephony service provider, a request to implement forwarding termination procedures; and means for sending, from the telephony device to a forwarding agent, a request that results in the native telephony service provider forwarding incoming telephony communications directed to the native identifier to a forwarding identifier.

10. A non-transitory computer readable medium storing instructions thereon which, when performed by one or more processors of a telephony device, cause the processors to perform a method of facilitating the termination of telephony communications to the telephony device, the telephony device being assigned a native identifier and being associated with a native telephony service provider, the method comprising:

sending, from the telephony device to a voice over Internet protocol (VOIP) telephony service provider, a request to implement forwarding termination procedures; and sending, from the telephony device to a forwarding agent, a request that results in the native telephony service provider forwarding incoming telephony communications directed to the native identifier to a forwarding identifier.

11. The non-transitory computer readable medium of claim 10, wherein the request sent to the forwarding agent asks the forwarding agent to cause the native telephony service provider to implement forwarding instructions that result in the native telephony service provider forwarding incoming telephony communications directed to the native identifier to a forwarding identifier.

12. The non-transitory computer readable medium of claim 10, wherein the method performed by the one or more processors also comprises receiving, from the VOIP telephony service provider, an indication of a forwarding identifier that has been assigned to the telephony device, wherein the request sent to the forwarding agent includes the assigned forwarding identifier.

13. The non-transitory computer readable medium of claim 10, wherein the method performed by the one or more processors further comprises:

receiving, from the forwarding agent, an indication of a forwarding identifier that has been assigned to the telephony device; and sending a message from the telephony device to the VOIP service provider that includes the assigned forwarding identifier.

14. A non-transitory computer readable medium storing instructions thereon which, when performed by one or more processors of a telephony device, cause the processors to perform a method of facilitating the termination of telephony communications to the telephony device, the telephony device being assigned a native identifier and being associated with a native telephony service provider, the method comprising:

receiving at the telephony device, a message from a voice over Internet protocol (VOIP) telephony service provider, the message indicating that forwarding termination procedures are to be implemented; and sending, from the telephony device to a forwarding agent, a request that results in the native telephony service provider forwarding incoming telephony communications directed to the native identifier to a forwarding identifier.

15. The non-transitory computer readable medium of claim 14, wherein the request asks the forwarding agent to cause the native telephony service provider to implement forwarding instructions that result in the native telephony service provider forwarding incoming telephony communications directed to the native identifier to a forwarding identifier.

16. The non-transitory computer readable medium of claim 15, wherein the message received from the VOIP telephony service provider includes the forwarding identifier, and wherein the request sent to the forwarding agent includes the forwarding identifier.

17. The non-transitory computer readable medium of claim 15, wherein the method performed by the one or more processors further comprises:
  receiving at the telephony device, a message from the forwarding agent, the message including the forwarding identifier; and
  sending, from the telephony device to the VOIP telephony service provider, a message that includes the forwarding identifier.

* * * * *

UNITED STATES PATENT AND TRADEMARK OFFICE
CERTIFICATE OF CORRECTION

PATENT NO.         : 9,002,335 B2
APPLICATION NO.    : 13/597485
DATED              : April 7, 2015
INVENTOR(S)        : Fighel Page 1 of 1

It is certified that error appears in the above-identified patent and that said Letters Patent is hereby corrected as shown below:

On the Title page, please add the following:

--(73) Assignee: Vonage Network, LLC, Holmdel, NJ--.

Signed and Sealed this
Twelfth Day of January, 2016

Michelle K. Lee
*Director of the United States Patent and Trademark Office*